US012719540B2

(12) United States Patent
Ibrahim et al.

(10) Patent No.: US 12,719,540 B2
(45) Date of Patent: Aug. 25, 2026

(54) DECOUPLING INTERFERENCE MEASUREMENT SLOT AND CHANNEL MEASUREMENT SLOT FOR CHANNEL STATE INFORMATION REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Wanshi Chen, San Diego, CA (US); Yu Zhang, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 18/164,127

(22) Filed: Feb. 3, 2023

(65) Prior Publication Data

US 2024/0267100 A1 Aug. 8, 2024

(51) Int. Cl.
*H04B 7/06* (2006.01)
*H04L 1/06* (2006.01)
(Continued)

(52) U.S. Cl.
CPC ......... *H04B 7/0626* (2013.01); *H04L 1/0693* (2013.01); *H04L 25/03012* (2013.01);
(Continued)

(58) Field of Classification Search
CPC ............. H04W 28/0236; H04W 40/16; H04W 72/0446; H04W 52/244; H04J 11/005;
(Continued)

(56) References Cited

U.S. PATENT DOCUMENTS

2019/0229781 A1* 7/2019 Jin ....................... H04B 7/0628
2021/0203464 A1* 7/2021 Ren ....................... H04L 5/0062
(Continued)

FOREIGN PATENT DOCUMENTS

WO 2021133974 A1 7/2021
WO 2022153264 A1 7/2022

OTHER PUBLICATIONS

International Search Report and Written Opinion—PCT/US2024/011218—ISA/EPO—May 8, 2024.

*Primary Examiner* — Salvador E Rivas
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating a channel state information (CSI) reference signal (CSI-RS) resource in a first slot and a first CSI interference measurement (CSI-IM) resource in a second slot different from the first slot. The UE may perform a channel measurement in the first slot using the CSI-RS resource. The UE may perform a first interference measurement in the second slot using the first CSI-IM resource. The UE may transmit a CSI report based at least in part on the channel measurement and the first interference measurement. Numerous other aspects are described.

30 Claims, 13 Drawing Sheets

(51) Int. Cl.

| | |
|---|---|
| ***H04L 25/03*** | (2006.01) |
| ***H04L 27/26*** | (2006.01) |
| ***H04W 28/02*** | (2009.01) |
| ***H04W 40/16*** | (2009.01) |
| ***H04W 52/24*** | (2009.01) |
| ***H04W 72/0446*** | (2023.01) |
| ***H04W 72/541*** | (2023.01) |
| *H04J 11/00* | (2006.01) |

(52) U.S. Cl.
CPC ..... *H04L 27/2671* (2013.01); *H04W 28/0236* (2013.01); *H04W 40/16* (2013.01); *H04W 52/244* (2013.01); *H04W 72/0446* (2013.01); *H04W 72/541* (2023.01); *H04J 11/0026* (2013.01); *H04J 11/005* (2013.01)

(58) Field of Classification Search
CPC ............... H04J 11/0026; H04B 7/0626; H04L 25/0301; H04L 27/2671; H04L 25/03012; H04L 1/0693; H05L 27/2691
See application file for complete search history.

(56) References Cited

U.S. PATENT DOCUMENTS

| | | | | |
|---|---|---|---|---|
| 2022/0014954 | A1* | 1/2022 | Ibrahim | H04W 72/21 |
| 2022/0022206 | A1* | 1/2022 | Ibrahim | H04L 1/0027 |
| 2022/0264318 | A1* | 8/2022 | Nilsson | H04B 7/0695 |
| 2022/0377747 | A1* | 11/2022 | Yuan | H04B 7/0695 |
| 2023/0046218 | A1* | 2/2023 | Matsumura | H04B 7/0626 |
| 2023/0141011 | A1* | 5/2023 | Elshafie | H04W 72/1273 370/329 |
| 2024/0088967 | A1* | 3/2024 | Gao | H04B 7/024 |
| 2025/0038906 | A1* | 1/2025 | Park | H04W 24/10 |
| 2025/0105895 | A1* | 3/2025 | You | H04B 7/0626 |

* cited by examiner

DECOUPLING INTERFERENCE MEASUREMENT SLOT AND CHANNEL MEASUREMENT SLOT FOR CHANNEL STATE INFORMATION REPORTING

FIELD OF THE DISCLOSURE

Aspects of the present disclosure generally relate to wireless communication and to techniques and apparatuses for decoupling an interference measurement slot and a channel measurement slot for channel state information reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information indicating a channel state information (CSI) reference signal (CSI-RS) resource in a first slot and a first CSI interference measurement (CSI-IM) resource in a second slot different from the first slot. The method may include performing a channel measurement in the first slot using the CSI-RS resource. The method may include performing a first interference measurement in the second slot using the first CSI-IM resource. The method may include transmitting a CSI report based at least in part on the channel measurement and the first interference measurement.

Some aspects described herein relate to a method of wireless communication performed by a network node. The method may include transmitting, to a UE, configuration information indicating a CSI-RS resource in a first slot and a first CSI-IM resource in a second slot different from the first slot. The method may include receiving, from the UE, a CSI report based at least in part on a channel measurement associated with the CSI-RS resource and a first interference measurement associated with the first CSI-IM resource.

Some aspects described herein relate to a UE for wireless communication. The UE may include a memory and one or more processors coupled to the memory. The one or more processors may be configured to receive configuration information indicating a CSI-RS resource in a first slot and a first CSI-IM resource in a second slot different from the first slot. The one or more processors may be configured to perform a channel measurement in the first slot using the CSI-RS resource. The one or more processors may be configured to perform a first interference measurement in the second slot using the first CSI-IM resource. The one or more processors may be configured to transmit a CSI report based at least in part on the channel measurement and the first interference measurement.

Some aspects described herein relate to a network node for wireless communication. The network node may include a memory and one or more processors coupled to the memory. The one or more processors may be configured to transmit, to a UE, configuration information indicating a CSI-RS resource in a first slot and a first CSI-IM resource in a second slot different from the first slot. The one or more processors may be configured to receive, from the UE, a CSI report based at least in part on a channel measurement associated with the CSI-RS resource and a first interference measurement associated with the first CSI-IM resource.

Some aspects described herein relate to a non-transitory computer-readable medium that stores a set of instructions for wireless communication by a UE. The set of instructions, when executed by one or more processors of the UE, may cause the UE to receive configuration information indicating a CSI-RS resource in a first slot and a first CSI-IM resource in a second slot different from the first slot. The set of instructions, when executed by one or more processors of the UE, may cause the UE to perform a channel measurement in the first slot using the CSI-RS resource. The set of instructions, when executed by one or more processors of the UE, may cause the UE to perform a first interference measurement in the second slot using the first CSI-IM resource. The set of instructions, when executed by one or more processors of the UE, may cause the UE to transmit a CSI report based at least in part on the channel measurement and the first interference measurement.

Some aspects described herein relate to a non-transitory computer-readable medium that stores a set of instructions for wireless communication by a network node. The set of instructions, when executed by one or more processors of the network node, may cause the network node to transmit, to a UE, configuration information indicating a CSI-RS resource in a first slot and a first CSI-IM resource in a second slot different from the first slot. The set of instructions, when executed by one or more processors of the network node, may cause the network node to receive, from the UE, a CSI report based at least in part on a channel measurement associated with the CSI-RS resource and a first interference measurement associated with the first CSI-IM resource.

Some aspects described herein relate to an apparatus for wireless communication. The apparatus may include means for receiving configuration information indicating a CSI-RS resource in a first slot and a first CSI-IM resource in a second slot different from the first slot. The apparatus may include means for performing a channel measurement in the first slot using the CSI-RS resource. The apparatus may include means for performing a first interference measurement in the second slot using the first CSI-IM resource. The apparatus may include means for transmitting a CSI report based at least in part on the channel measurement and the first interference measurement.

Some aspects described herein relate to an apparatus for wireless communication. The apparatus may include means for transmitting, to a UE, configuration information indicating a CSI-RS resource in a first slot and a first CSI-IM resource in a second slot different from the first slot. The apparatus may include means for receiving, from the UE, a CSI report based at least in part on a channel measurement associated with the CSI-RS resource and a first interference measurement associated with the first CSI-IM resource.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
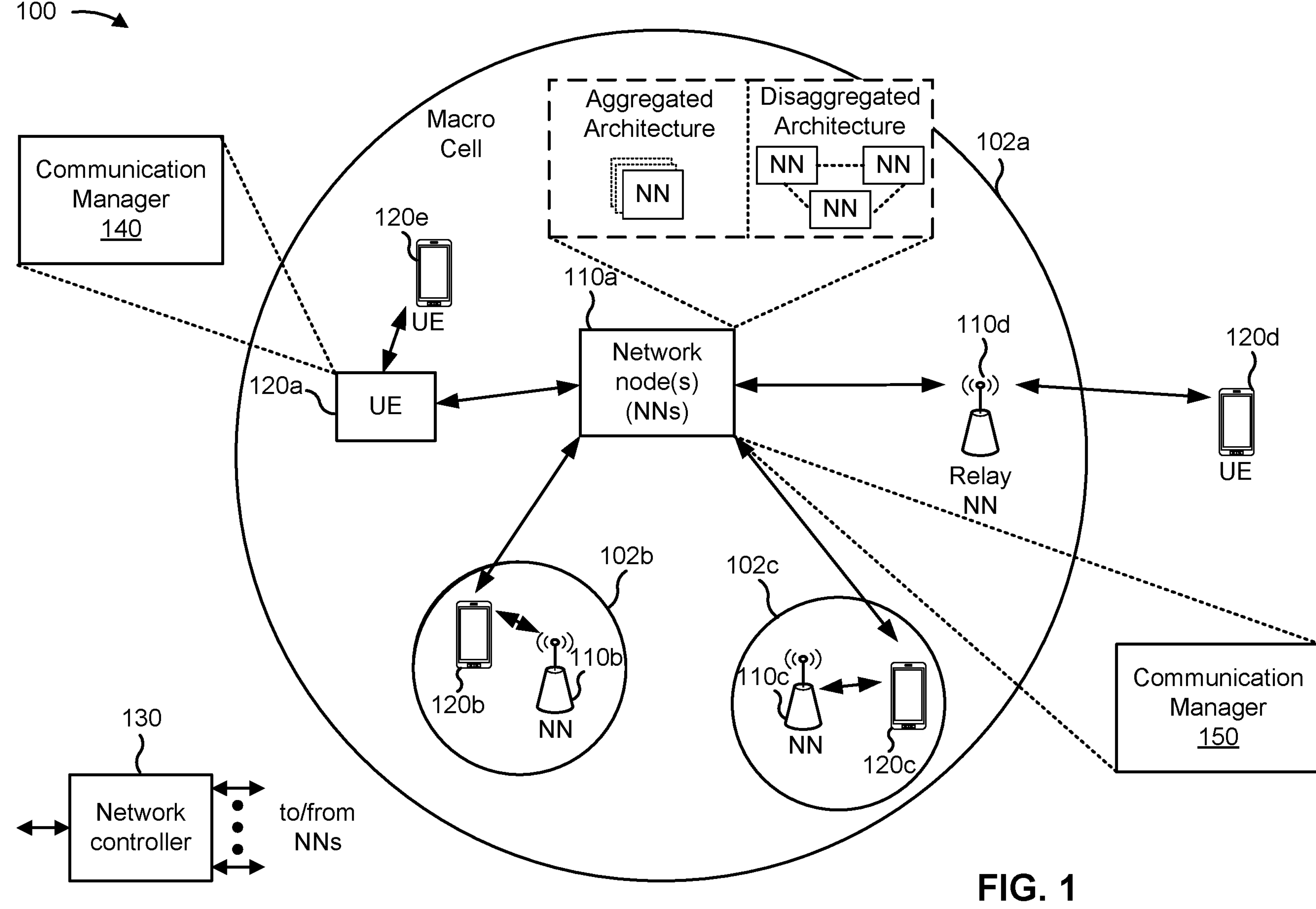
FIG. 1 is a diagram illustrating an example of a wireless network, in accordance with the present disclosure.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some wireless communication networks, a user equipment (UE) may transmit, to a network node, information about a downlink channel. For example, the UE may perform channel estimation and may report channel estimation parameters (sometimes referred to as channel state information (CSI)) to the network node, such as via a CSI report. For static channels and/or frame structures associated with constant slot formats, the CSI reporting may be relatively infrequent. However, for dynamic channels and/or frame structures associated with varying slot formats, the CSI reporting may be more frequent. For example, a network node and/or a UE may be configured to operate in a subband full duplex (SBFD) mode, in which the network node and/or the UE may simultaneously receive and transmit communications in a same time domain resource (e.g., slot) using multiple frequency subbands. In contrast to half duplex (HD) slots, in which an entire bandwidth may be associated with uplink communications or downlink communications, in an SBFD slot one or more subbands may be associated with downlink communications while one or more other subbands may be associated with uplink communications.

In this regard, CSI may differ between HD slots and nearby SBFD slots, because subbands within the SBFD slots may suffer from cross-link interference (CLI) resulting from communications in other subbands. Thus, in order to provide accurate CSI, a UE may need to measure both interference within the HD slot using a first interference measurement resource (IMR) and interference in the SBFD slot using a second IMR. Because a CSI report configuration may require that channel measurement resources (CMRs) and IMRs occur within a same slot (sometimes referred to herein as the CMR and IMR being coupled), measuring interference in both the HD slot and the SBFD slot may result in high resource allocation. More particularly, the UE may need to be allocated with at least a first CMR and a coupled first IMR within a first slot (e.g., an HD slot), and a second CMR and a coupled second IMR within a second slot (e.g., an SBFD slot). This results in high overhead and thus high power, computing, and network resource consumption used for CSI reporting.

Some techniques and apparatuses described herein enable decoupling of an interference measurement slot and a channel measurement slot for CSI reporting to decrease overhead associated with CSI reporting and/or to reduce power, network, and/or computing resource consumption associated with redundant channel measurements. In some aspects, a UE may receive a CSI report configuration indicating a CMR in a first slot (e.g., a HD slot) and one or more associated IMRs, such as an IMR in a second slot different from the first slot (e.g., an SBFD slot). Accordingly, the UE may perform a channel measurement in the first slot using the CMR, may perform an interference measurement in the second slot using the IMR, and may transmit a CSI report based at least in part on the channel measurement (e.g., the HD slot channel measurement) and the interference measurement (e.g., the SBFD slot interference measurement). By decoupling the CMR from the IMR (e.g., by enabling the resources to be provided in different slots), overhead may be reduced because a single CMR may be associated with multiple IMRs (e.g., IMRs associated with multiple slots), thereby eliminating redundant channel measurements while providing accurate interference measurements across the differing slot structures. In that regard, decoupling the CMR from the IMR may result in reduced power, network, and/or computing resource consumption for CSI reporting.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node **110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110** that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node **110*d* (e.g., a relay network node) may communicate with the network node 110*a* (e.g., a macro network node) and the UE 120*d* in order to facilitate communication between the network node 110*a* and the UE 120*d*. A network node 110** that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating a CSI reference signal (CSI-RS) resource in a first slot and a first CSI interference measurement (CSI-IM) resource in a second slot different from the first slot; perform a channel measurement in the first slot using the CSI-RS resource; perform a first interference measurement in the second slot using the first CSI-IM resource; and transmit a CSI report based at least in part on the channel measurement and the first interference measurement. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information indicating a CSI-RS resource in a first slot and a first CSI-IM resource in a second slot different from the first slot; and receive, from the UE, a CSI report based at least in part on a channel measurement associated with the CSI-RS resource and a first interference measurement associated with the first CSI-IM resource. Additionally, or alternatively, the communication manager 150 may perform one or more other operations described herein.

As indicated above, FIG. 1 is provided as an example. Other examples may differ from what is described with regard to FIG. 1.

Figure 2:
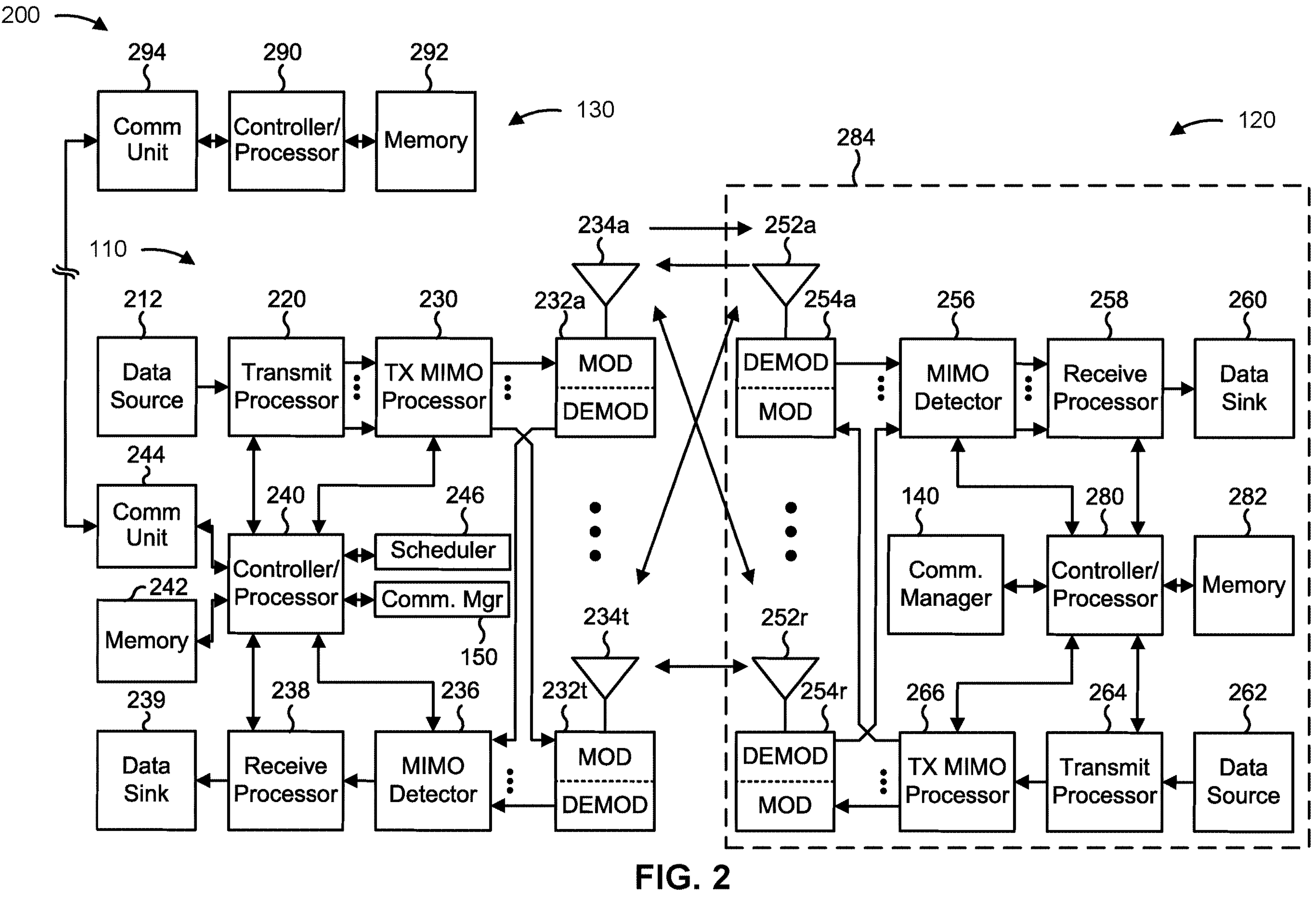
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-12).

The controller/processor 240 of the network node 110, the controller/processor 280 of the UE 120, and/or any other component(s) of FIG. 2 may perform one or more techniques associated with decoupling an interference measurement slot and a channel measurement slot for CSI reporting, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving configuration information indicating a CSI-RS resource in a first slot and a first CSI-IM resource in a second slot different from the first slot; means for performing a channel measurement in the first slot using the CSI-RS resource; means for performing a first interference measurement in the second slot using the first CSI-IM resource; and/or means for transmitting a CSI report based at least in part on the channel measurement and the first interference measurement. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information indicating a CSI-RS resource in a first slot and a first CSI-IM resource in a second slot different from the first slot; and/or means for receiving, from the UE, a CSI report based at least in part on a channel measurement associated with the CSI-RS resource and a first interference measurement associated with the first CSI-IM resource. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
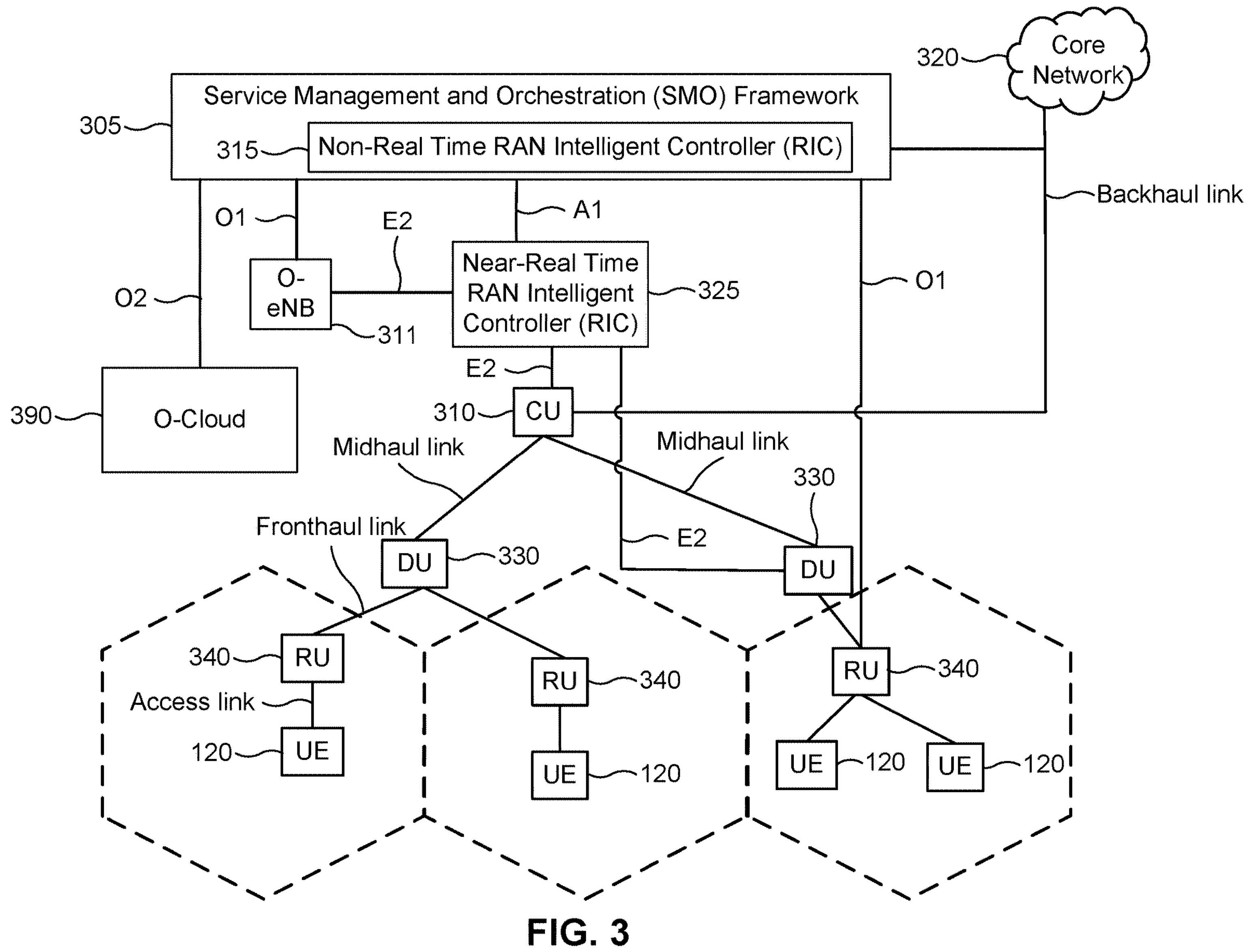
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4B:
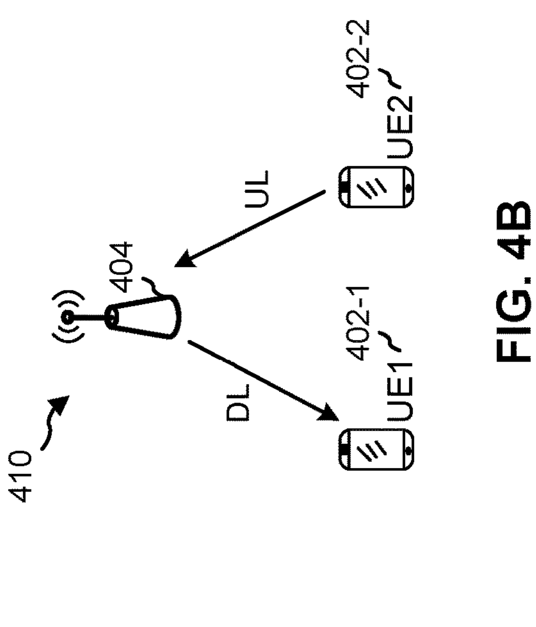
FIGS. 4A-4C are diagrams illustrating examples of full duplex (FD) communication, in accordance with the present disclosure.
Figure 4C:
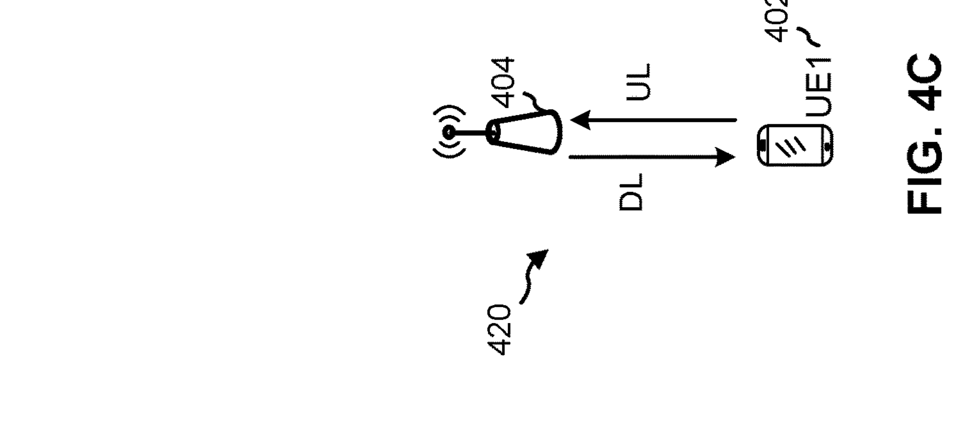
Figure 4A:
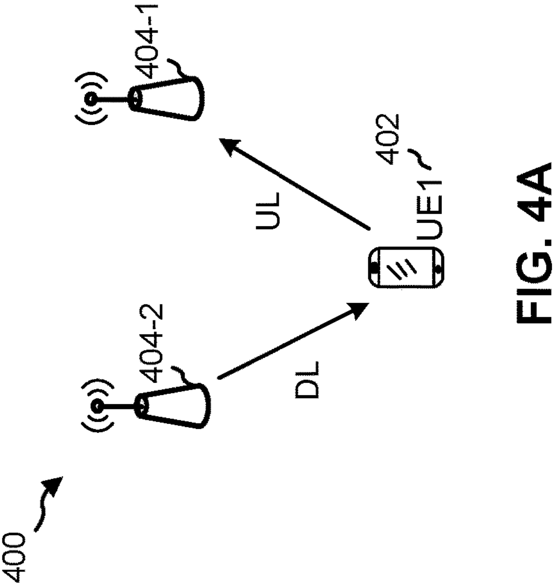

FIGS. 4A-4C are diagrams illustrating examples 400, 410, 420 of full duplex (FD) communication in accordance with the present disclosure. "FD communication" in a wireless network refers to simultaneous bi-directional communication between devices in the wireless network. For example, a UE 120 operating in an FD mode may transmit an uplink communication and receive a downlink communication at the same time (e.g., in the same slot or the same symbol). "HD communication" in a wireless network refers to unidirectional communications (e.g., only downlink communication or only uplink communication) between devices at a given time (e.g., in a given slot or a given symbol).

The example 400 of FIG. 4A includes a UE1 402 (e.g., UE 120) and two network nodes 404-1, 404-2 (e.g., network nodes 110), where the UE1 402 is sending UL transmissions to the network node 404-1 and is receiving DL transmissions from the network node 404-2. In the example 400 of FIG. 4A, FD is enabled for the UE1 402, but not for the network nodes 404-1, 404-2. The example 410 of FIG. 4B includes two UEs, shown as UE1 402-1 and UE2 402-2, and a network node 404, where the UE1 402-1 is receiving a DL transmission from the network node 404 and the UE2 402-2 is transmitting an UL transmission to the network node 404. In the example 410 of FIG. 4B, FD is enabled for the network node 404, but not for the UE1 402-1 and the UE2 402-2. The example 420 of FIG. 4C includes a UE1 402 and a network node 404, where the UE1 402 is receiving a DL transmission from the network node 404 and the UE1 402 is transmitting an UL transmission to the network node 404. In the example 420 of FIG. 4C, FD is enabled for both the UE1 402 and network node 404.

In some examples, in order to implement one or more of the FD communication schemes described above, a network node 404 and a UE 402 may operate using non-overlapping UL/DL subbands, while, in some other examples, a network node 404 and a UE 402 may operate using partially or fully overlapping UL/DL resources. Aspects of non-overlapping UL/DL subbands and partially or fully overlapping UL/DL resources are described in more detail below in connection with FIG. 5.

As indicated above, FIGS. 4A-4C are provided as one or more examples. Other examples may differ from what is described with regard to FIGS. 4A-4C.

Figure 5:
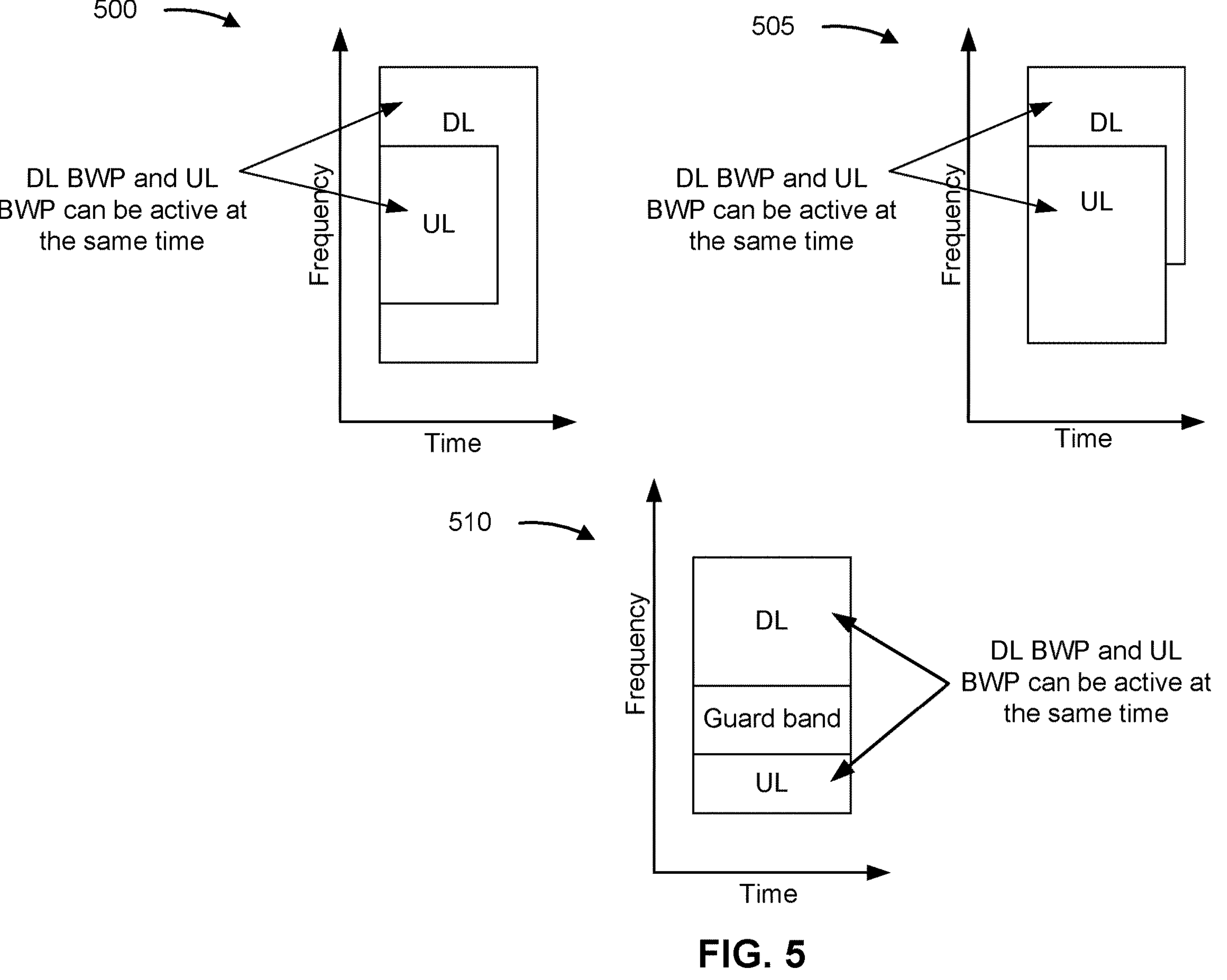
FIG. 5 is a diagram illustrating examples of FD communication in a wireless network, in accordance with the present disclosure.

FIG. 5 is a diagram illustrating examples 500, 505, and 510 of FD communication in a wireless network, in accordance with the present disclosure.

As shown in FIG. 5, examples 500 and 505 show examples of in-band FD (IBFD) communication. In IBFD, a UE 120 may transmit an uplink communication to a network node 110 and receive a downlink communication from the network node 110 on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of SBFD communication, which may also be referred to as "subband frequency division duplex (SBFDD)" or "flexible duplex." In SBFD, a UE 120 may transmit an uplink communication to a network node 110 and receive a downlink communication from the network node 110 at the same time, but on different frequency resources. For example, the different frequency resources may be subbands of a frequency band, such as a time division duplexing band. In this case, the frequency resources used for downlink communication may be separated from the frequency resources used for uplink communication, in the frequency domain, by a guard band.

In examples in which a network node 110 and/or a UE 120 are operating in an FD mode, such as in SBFD scenarios, the network node 110 may require CSI (e.g., an MCS, a rank indicator (RI), a precoding matrix indicator (PMI), or similar information) for the different subbands. More particularly, with reference to example 510, the network node 110 may require CSI for both the DL subband and the UL subband. In such examples, the UE 120 may be configured with a CSI report configuration (sometimes referred to as a CSI reporting setting) indicating resources for performing measurements associated with a CSI report to be transmitted by the UE 120 to the network node 110, among other information. Aspects of a CSI reporting setting are described in more detail below in connection with FIG. 6.

As indicated above, FIG. 5 is provided as an example. Other examples may differ from what is described with respect to FIG. 5.

Figure 6:
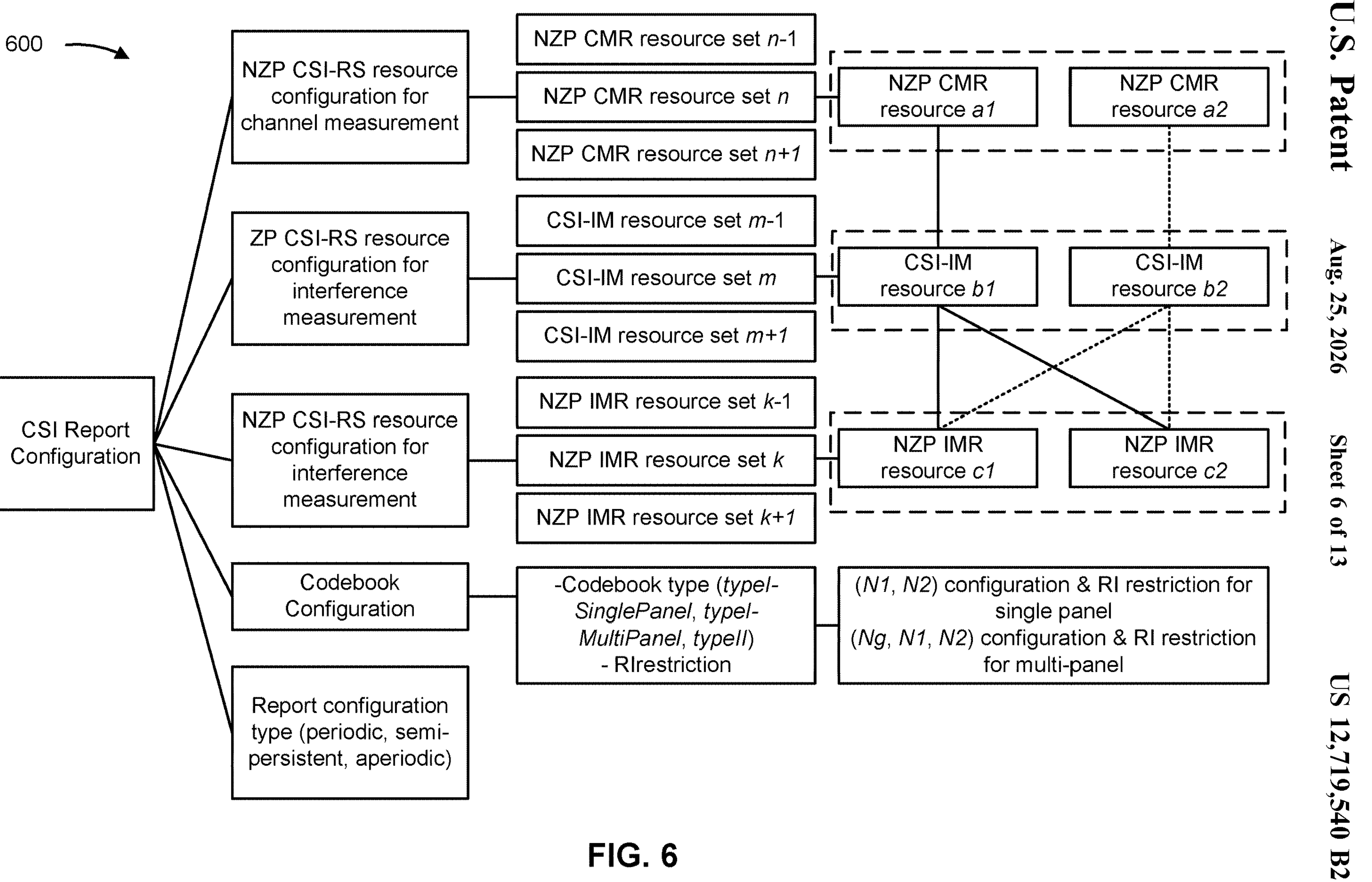
FIG. 6 is a diagram illustrating an example of a channel state information (CSI) reporting setting, in accordance with the present disclosure.

FIG. 6 is a diagram illustrating an example 600 of a CSI reporting setting, in accordance with the present disclosure.

A CSI reporting setting may be used by a network node 110 to configure a UE 120 with multiple resources for performing certain measurements associated a channel between the network node 110 and the UE 120 and/or with certain parameters indicating how the measurements are to be reported by the UE 120 to the network node 110. More particularly, a CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. For example, the network node 110 may configure a set of CSI-RS resources using a CSI reporting setting (e.g., a CSI report configuration). A CSI reporting setting may indicate resources and/or parameters associated with a CSI report to be transmitted by the UE 120 to the network node 110. For example, as shown by example 600, the CSI reporting setting may indicate a non-zero-power (NZP) CSI-RS resource configuration for channel measurement (sometimes referred to herein as a CMR configuration), a zero-power (ZP) CSI-RS resource configuration for interference management (sometimes referred to herein as an IMR configuration), a NZP CSI-RS resource configuration for interference management, a codebook configuration, and/or a report configuration type, among other information.

The codebook configuration may indicate a codebook type associated with the CSI report, such as one of a type I, single panel codebook (sometimes referred to as typeI-SinglePanel); a type I, multi-panel codebook (sometimes referred to as typeI-MultiPanel); or a type II codebook (sometimes referred to as typeII). The codebook configuration may further indicate an RI restriction (sometimes referred to as RIrestriction). In some examples, the codebook configuration may indicate an antenna array configuration, such as (N1, N2) and a corresponding RI restriction for a single panel configuration, and/or (Ng, N1, N2) and a corresponding RI restriction for a multi-panel configuration. The report configuration type may indicate a periodicity with which the UE 120 is to transmit the CSI report, such as whether the CSI report a periodic report, a semi-persistent report, or an aperiodic report.

The CMR configuration may indicate resources associated with the UE 120 performing a channel measurement using NZP CSI-RS resources (e.g., resources in which the network node 110 transmits a CSI-RS to the UE 120). More particularly, the CMR configuration may indicate a NZP CMR resource set (sometimes referred to herein as a CSI-RS resource set) to be used for performing the channel measurement. For example, in the example 600, the CMR configuration indicates that the NZP CMR resource set n should be used for performing the channel measurement. The CSI-RS resource set may include one or more NZP CMR resources (sometimes referred to herein as CSI-RS resources), such as NZP CMR resource a1 and NZP CMR resource a2 in the example 600.

The IMR configuration may indicate ZP resources (e.g., resources in which the network node 110 does not transmit a CSI-RS to the UE 120) associated with the UE 120 performing an interference measurement. More particularly, the IMR configuration may indicate a CSI-IM resource set to be used for performing the interference measurement. For example, in the example 600, the IMR configuration indicates that the CSI-IM resource set m should be used for performing the interference measurement. The CSI-IM resource set may include one or more CSI-IM resources, such as CSI-IM resource b1 and CSI-IM resource b2 in the example 600.

The NZP CSI-RS resource configuration for interference measurement may indicate NZP resources associated with the UE 120 performing an NZP interference measurement (e.g., an interference measurement based at least in part on a CSI-RS transmitted by the network node 110 to the UE 120). More particularly, the NZP CSI-RS resource configuration for interference measurement may indicate an NZP IMR resource set to be used for performing the NZP interference measurement. For example, in example 600, the NZP CSI-RS resource configuration for interference measurement indicates that the NZP IMR resource set k should be used for performing the NZP interference measurement. The NZP IMR resource set may include one or more NZP IMR resources, such as NZP IMR resource c1 and NZP IMR resource c2 in the example 600.

The CSI reporting setting may associate each CSI-RS resource with a corresponding CSI-IM resource. More particularly, each CSI-RS resource may be resource-wise associated with a corresponding CSI-IM resource by the ordering of the CSI-RS resource and the CSI-IM resource in the corresponding resource sets. In that regard, a number of CSI-RS resources indicated by the CSI reporting setting may equal a number of CSI-IM resources indicated by the CSI reporting setting. Moreover, a CSI-RS resource and an associated CSI-IM resource may occur within a same slot. Thus, in example 600, NZP CMR resource a1 may occur in a same slot as CSI-IM resource b1, NZP CMR resource a2 may occur in a same slot as CSI-IM resource b2, and so forth.

Based at least in part on the measurements of the CSI-RS resources and the CSI-IM resources, the UE 120 may perform channel estimation and may report channel estimation parameters to the network node 110 (e.g., in a CSI report), such as a CQI, a PMI, a CSI-RS resource indicator (CRI), a layer indicator (LI), a RI, or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

In some examples, a network node 110 may require CSI for multiple subbands, such as when the network node 110 is operating in an SBFD mode. For example, in aspects in which the network node 110 is communicating with the UE 120 using an HD slot (such a downlink slot, sometimes referred to as a "D" slot in a time domain resource allocation) followed by an SBFD slot (e.g., a D slot in which a middle subband is used to as an UL subband and/or a guard band (GB), thus resulting in two separate DL subbands separated by an UL subband and/or a GB), the network node 110 may require CSI for the HD slot as well as the two DL subbands in the SBFD slot. In such examples, a downlink channel may be relatively static between the two slots, because the slots are relatively close in time. However, interference associated with the HD slot may differ from interference associated with the SBFD slot due to the presence of uplink signals within the SBFD slot and not within the HD slot. Put another why, the downlink channel may experience inter-cell interference in the HD slot, and the downlink channel may experience inter-cell interference as well as CLI in the SBFD slot due to the presence of uplink and downlink subbands in the SBFD slot. In that regard, in order to provide accurate CSI, the UE may need to provide a channel measurement associated with the HD slot and/or the downlink subbands in the SBFD slot, an interference measurement in the HD slot (e.g., to capture an impact of inter-cell interference), and an interference measurement in the SBFD slot (e.g., to capture an impact of inter-cell interference as well as CLI). This may require high overhead (and thus high power, network, and computing resource consumption) because a first CMR configuration and an associated first IMR configuration may need to be configured for the HD slot, and a second CMR configuration and an associated second IMR configuration may need to be configured for the SBFD slot.

Some techniques and apparatuses described herein enable decoupling of an interference measurement slot and a channel measurement slot for CSI reporting to decrease overhead associated with CSI reporting for SBFD slots and/or to reduce power, network, and/or computing resource consumption associated with redundant channel measurements. In some aspects, a UE 120 may receive a CSI reporting setting indicating a CSI-RS resource in a first slot (e.g., an HD slot) and one or more associated CSI-IM resources, such as a CSI-IM resource in a second slot different from the first slot (e.g., an SBFD slot). Accordingly, the UE 120 may perform a channel measurement in the first slot using the CSI-RS resource, may perform an interference measurement in the second slot using the CSI-IM resource, and may transmit a CSI report based at least in part on the channel measurement (e.g., the HD slot channel measurement) and the interference measurement (e.g., the SBFD slot interference measurement). By decoupling the CSI-RS resource from the CSI-IM resource (e.g., by enabling the resources to be provided in different slots), overhead may be reduced because a single CSI-RS resource may be associated with CSI-IM resources in multiple slots, thereby eliminating redundant channel measurements and/or reducing power, network, and/or computing resource consumption that may otherwise be used to provide accurate CSI for multiple HD and FD slot formats.

As indicated above, FIG. 6 is provided as an example. Other examples may differ from what is described with respect to FIG. 6.

Figure 7A:
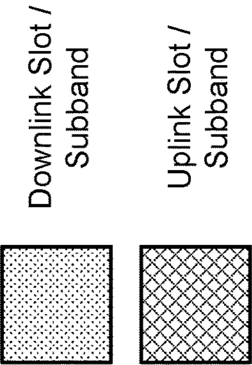
FIGS. 7A-7B are diagrams illustrating examples associated with decoupling an interference measurement slot and a channel measurement slot for CSI reporting, in accordance with the present disclosure.
Figure 7A:
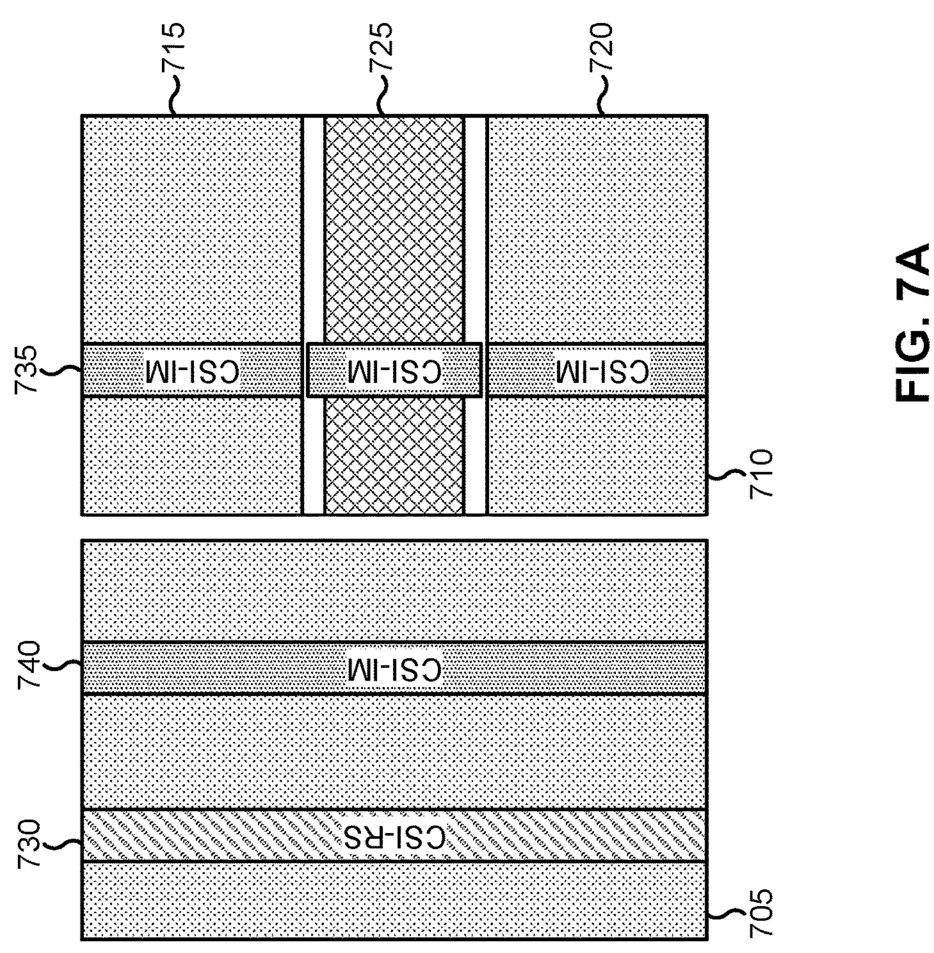
Figure 7B:
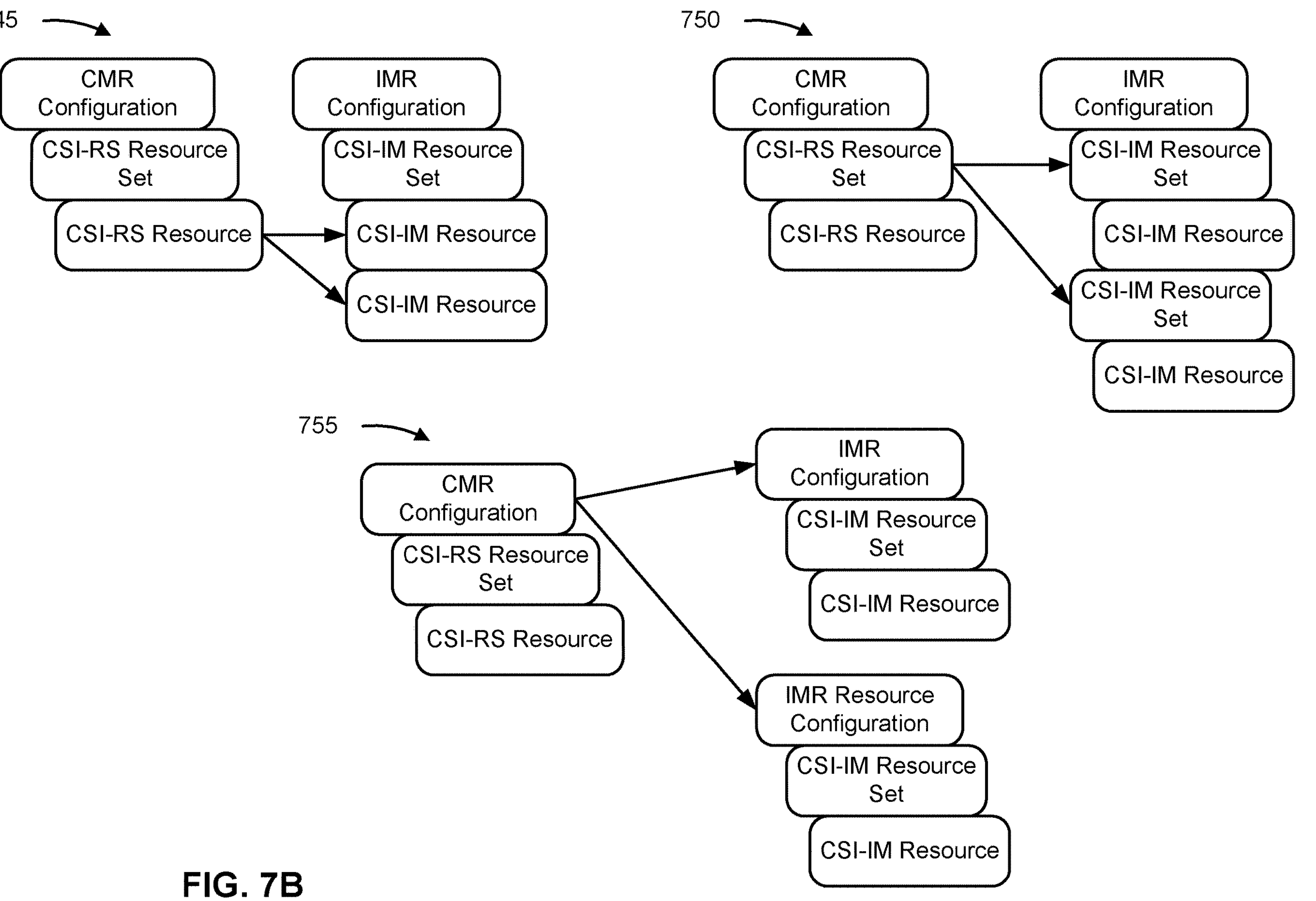

FIGS. 7A-7B are diagrams illustrating examples associated with decoupling an interference measurement slot and a channel measurement slot for CSI reporting, in accordance with the present disclosure. The examples described in connection with FIGS. 7A-7B may be associated with communications between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown by example 700 in FIG. 7A, in some aspects measurement resource overhead (e.g., overhead associated with CSI-RS resources and/or CSI-IM resources) may be reduced by configuring a CSI-RS resource in one slot (e.g., a HD slot and/or a downlink slot) that is associated with CSI-IM resources in multiple slots (e.g., the HD slot and an SBFD slot). More particularly, in the example 700, a network node 110 and a UE 120 may communicate using a frame structure that includes an HD slot 705 (e.g., a downlink slot or D slot), and an SBFD slot 710. In some aspects, the SBFD slot may be a slot that is semi-statically configured as a D slot by a time domain resource allocation, but which is configured such that a subband of the SBFD slot 710 may be used for uplink communications. More particularly, the SBFD slot 710 may be associated with two downlink subbands (e.g., a first downlink subband 715 and a second downlink subband 720) and an uplink subband 725. In some aspects, the uplink subband 725 may be separated from the first downlink subband 715 and/or the second downlink subband 720 via a GB.

In some aspects, a UE 120 may be configured with measurement resources (e.g., one or more CMRs and/or one or more IMRs), such as via a CSI reporting setting similar to the CSI reporting setting described above in connection with FIG. 6. In some aspects, in order to reduce measurement resource overhead, a CMR in a first slot may be associated with multiple IMRs, such as an IMR in the first slot and an IMR in another slot. More particularly, in the example 700, the UE 120 may be configured with a CSI-RS resource 730 in the HD slot 705, which may be used by the UE 120 to perform channel measurements in the HD slot 705. The CSI reporting setting may associate the CSI-RS resource 730 with multiple IMRs, such as a first CSI-IM resource 735 in the SBFD slot 710 and a second CSI-IM resource 740 in the HD slot 705. In this regard, the CSI-RS resource 730 may be decoupled from at least one IMR (e.g., the CSI-RS resource 730 may be included in a different slot than an associated IMR). More particularly, in example 700, the CSI-RS resource 730 is decoupled from the first CSI-IM resource 735, meaning that the CSI-RS resource 730 is included in a first slot (e.g., the HD slot 705) and the first CSI-IM resource 735 is included in a second slot different from the first slot (e.g., the SBFD slot 710). By configuring a CSI report that decouples one or more CMRs from one or more IMRs, measurement resources may be reduced as compared to examples in which a CMR must be coupled to a corresponding IMR. More particularly, in example 700, no CMR resources are provided in the SBFD slot 710, thereby freeing up resources in the SBFD slot 710 that would otherwise be needed for a CMR and thus increasing network capacity.

In some aspects, a CSI reporting setting may associate multiple IMRs with a CMR. For example, in the example 700, the CSI reporting setting may associate both the first CSI-IM resource 735 in the SBFD slot 710 (sometimes referred to herein as a CSI-IM-SBFD) and the second CSI-IM resource 740 in the HD slot 705 (sometimes referred to herein as a CSI-IM-HD) with the CSI-RS resource 730. In such aspects, a UE 120 may perform a channel measurement using the CSI-RS resource 730, may perform a first interference measurement using the first CSI-IM resource 735 (e.g., the CSI-IM-SBFD), and may perform a second interference measurement using the second CSI-IM resource 740 (e.g., the CSI-IM-HD). Additionally, or alternatively, the network node 110 may implicitly or explicitly indicate to the UE 120 which interference measurement should be used for a given CSI report, which is described in more detail below in connection with reference numbers 830 and 835 in FIG. 8.

Moreover, the UE 120 may maintain two interference measurements corresponding to the two CSI-IM resources 735, 740. For example, the UE 120 may maintain a first average interference measurement associated with SBFD slots (e.g., an average interference measurement calculated using measurements performed using the first CSI-IM resource 735), and/or the UE 120 may maintain a second average interference measurement associated with HD slots (e.g., an average interference measurement calculated using measurements performed using the second CSI-IM resource 740). In some aspects, a CSI report may include a selected one of the first average interference measurement or the second average interference measurement based at least in part on an implicit or explicit indication from the network node 110, a configured periodicity of CSI-IM-SBFD and/or CSI-IM-HD reporting, or similar information, which is described in more detail below in connection with reference numbers 830 and 835 in FIG. 8.

FIG. 7B shows various examples of how a CSI reporting setting may associate a CSI-RS resource with multiple CSI-IM resources, including at least one decoupled CSI-IM resource (e.g., a CSI-IM resource that is in a different slot than the CSI-RS resource). As shown by example 745, in some aspects a CSI reporting setting and/or a CSI report may be associated with one CMR configuration and one IMR configuration that indicates one CSI-IM resource set associated with a CSI-RS resource set indicated by the CMR configuration. The CMR configuration may indicate a CSI-RS resource set that includes one or more CSI-RS resources (e.g., CSI-RS resource 730). The IMR configuration may indicate a CSI-IM resource set that includes, for every CSI-RS resource of the one or more CSI-RS resources indicated by the CMR configuration, two CSI-IM resources (e.g., the first CSI-IM resource 735 and the second CSI-IM resource 740). Put another way, in this example the CSI-IM resource set may include double the number of resources as included in the CSI-RS resource set such that each CSI-RS resource is associated with two CSI-IM resources in the CSI-IM resource set. In some aspects, the two CSI-IM resources (e.g., the first CSI-IM resource 735 and the second CSI-IM resource 740) associated with a single CSI-RS resource (e.g., the CSI-RS resource 730) may be configured with different periodicities and/or different offsets such that one of the CSI-IM resources is used for interference measurement in SBFD slots (e.g., SBFD slot 710) and the other one of the CSI-IM resources is used for interference measurement in HD slots (e.g., HD slot 705).

In some other aspects, as shown by example 750, a CSI reporting setting and/or a CSI report may be associated with one CMR configuration and one IMR configuration that indicates two CSI-IM resource sets. In such aspects, the CSI-RS resource set may be associated with two CSI-IM resource sets. Accordingly, a CSI-RS resource included in the CSI-RS resource set (e.g., the CSI-RS resource 730) may be associated with a first CSI-IM resource (e.g., the first CSI-IM resource 735) included in a first CSI-IM resource set, of the two CSI-IM resource sets, as well as a second CSI-IM resource (e.g., the second CSI-IM resource 740) included in a second CSI-IM resource set, of the two CSI-IM resource sets.

In some other aspects, as shown by example 755, a CSI reporting setting and/or a CSI report may be associated with one CMR configuration and two IMR configurations, with each IMR configuration indicating a corresponding CSI-IM resource set. In such aspects, the CSI-RS resource set may be associated with a first CSI-IM resource set associated with a first IMR configuration, of the two IMR configurations, as well as a second CSI-IM resource set associated with a second IMR configuration, of the two IMR configurations. Accordingly, a CSI-RS resource included in the CSI-RS resource set (e.g., the CSI-RS resource 730) may be associated with a first CSI-IM resource (e.g., the first CSI-IM resource 735) included in a first CSI-IM resource set indicated by the first IMR configuration, of the two IMR configurations, as well as a second CSI-IM resource (e.g., the second CSI-IM resource 740) included in a second CSI-IM resource set indicated by a second IMR configuration, of the two IMR configurations.

Aspects of configuring a UE 120 with multiple CSI-IM resources associated with a single CSI-RS resource (such as one of the CSI reporting settings described above in connection with examples 745, 750, and 755) and/or aspects of a UE 120 reporting CSI based at least in part on a decoupled CMR and IMR (e.g., a CMR and IMR located in different slots) are described in more detail below in connection with FIG. 8.

As indicated above, FIGS. 7A-7B are provided as examples. Other examples may differ from what is described with respect to FIGS. 7A-7B.

Figure 8:
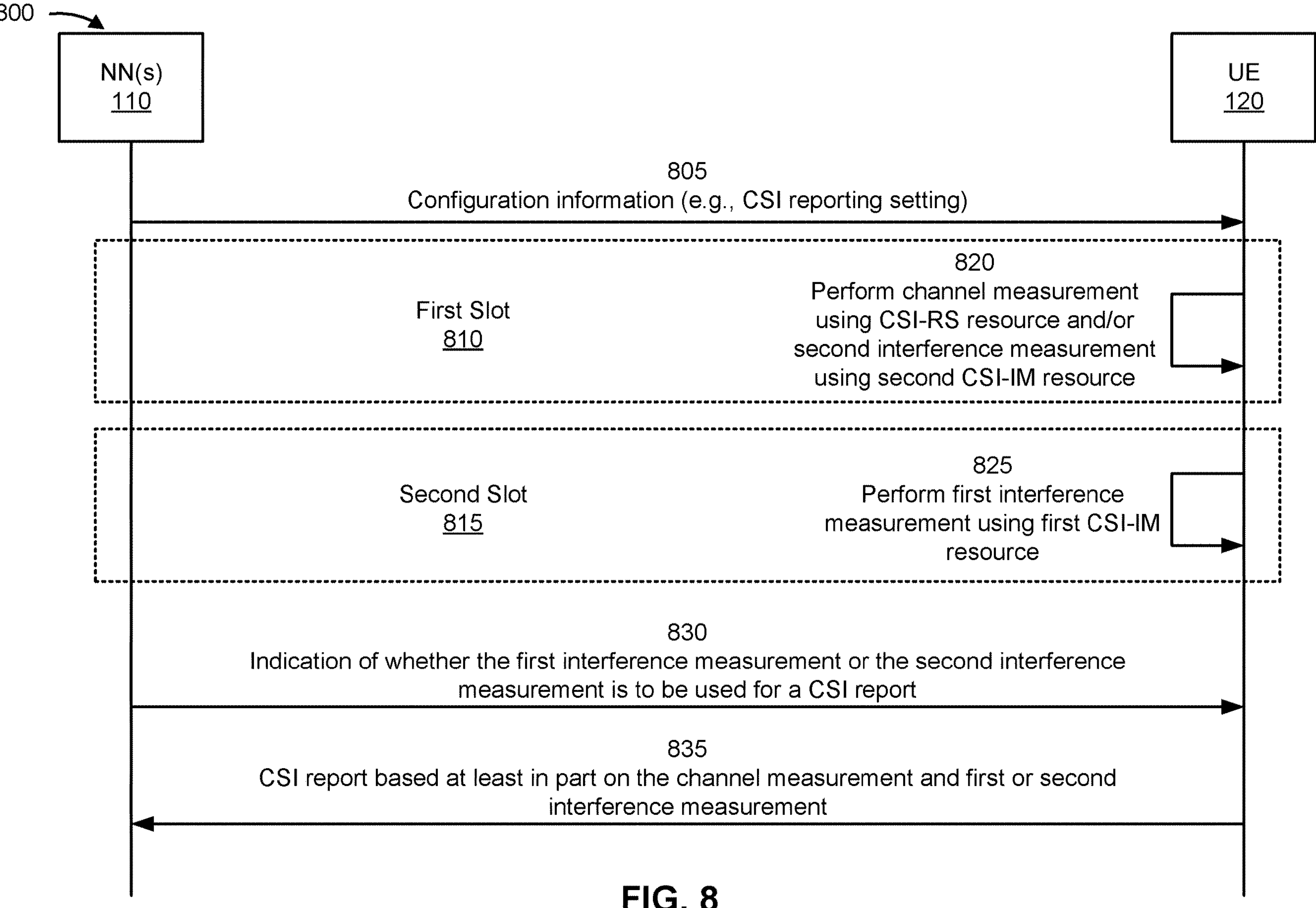
FIG. 8 is a diagram of another example associated with decoupling an interference measurement slot and a channel measurement slot for CSI reporting, in accordance with the present disclosure.

FIG. 8 is a diagram of an example 800 associated with decoupling an interference measurement slot and a channel measurement slot for CSI reporting, in accordance with the present disclosure. As shown in FIG. 8, a network node 110 (e.g., a CU, a DU, and/or an RU) may communicate with a UE 120. In some aspects, the network node 110 and the UE 120 may be part of a wireless network (e.g., wireless network 100). The network node 110 and the UE 120 may have established a wireless connection prior to operations shown in FIG. 8. In some aspects, the network node 110 and/or the UE 120 may be capable of operating in an FD mode, such as one or more of the FD modes described above in connection with FIGS. 4A-4C and/or by using one or more of the slot structures described above in connection with FIGS. 5 and 7A.

As shown by reference number 805, the network node 110 may transmit, and the UE 120 may receive, configuration information. In some aspects, the UE 120 may receive the configuration information via one or more of RRC signaling, one or more MAC control elements (MAC-CEs), and/or downlink control information (DCI), among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may indicate a CSI-RS resource in a first slot (shown in FIG. 8 as a first slot 810) and a first CSI-IM resource in a second slot different from the first slot (shown in FIG. 8 as a second slot 815). In some aspects, the first slot may be associated with an HD slot, and the second slot may be associated with an SBFD slot. For example, the CSI-RS resource may correspond to the CSI-RS resource 730 in the HD slot 705 described above in connection with FIG. 7A, and the first CSI-IM resource may correspond to the first CSI-IM resource 735 in the SBFD slot 710 described above in connection with FIG. 7A. In that regard, the configuration information may further indicate a second CSI-IM resource associated with the first slot 810. In some aspects, the second CSI-IM resource may correspond to the second CSI-IM resource 740 in the HD slot 705 described above in connection with FIG. 7A.

In a similar manner as described above in detail in connection with FIG. 7B, in some aspects the configuration information may associate the CSI-RS resource with the two CSI-IM resources, such that the CSI-RS resource is associated with at least one decoupled CSI-IM resource (e.g., such that the CSI-RS resource is associated with at least one CSI-IM resource located in a different slot than a slot including the CSI-RS resource). More particularly, in a similar manner as described above in connection with example 745, the configuration information may include a CMR configuration associated with a CSI-RS resource set including the CSI-RS resource and an IMR configuration associated with a CSI-IM resource set including the first CSI-IM resource and the second CSI-IM resource. In such aspects, and the configuration information may indicate that the first CSI-IM resource and the second CSI-IM resource are associated with the CSI-RS resource. Additionally, or alternatively, the first CSI-IM resource may be associated with a first period and/or a first offset, and the second CSI-IM resource may be associated with a second period and/or a second offset that differs from the first period and/or the first offset. For example, the first period and/or the first offset may be associated with an SBFD slot, and the second period and/or the second offset may be associated with an HD slot. Put another way, the CSI-IM resource set may contain double the number of resources that are included in the CSI-RS resource set such that each CSI-RS resource is associated with two CSI-IM resources in the CSI-IM resource set, with the two CSI-IM resources being configured with different periodicities and/or offsets such that one CSI-IM resource is used for interference measurement in HD slots and one CSI-IM resource is used for interference measurement in SBFD slots.

In some other aspects, as described above in connection with example 750, the configuration information may include a CMR configuration associated with a CSI-RS resource set including the CSI-RS resource and an IMR configuration associated with a first CSI-IM resource set that includes the first CSI-IM resource and a second CSI-IM resource set that includes the second CSI-IM resource. In such aspects, the configuration information may indicate that the first CSI-IM resource set and the second CSI-IM resource set are associated with the CSI-RS resource set.

In some other aspects, as described above in connection with example 755, the configuration information may include a CMR configuration associated with a CSI-RS resource set including the CSI-RS resource, a first IMR configuration associated with a first CSI-IM resource set including the first CSI-IM resource, and a second IMR configuration associated with a second CSI-IM resource set including the second CSI-IM resource. In such aspects, the configuration information may indicate that the first IMR configuration and the second IMR configuration are associated with the CMR configuration.

The UE 120 may configure itself based at least in part on the configuration information. In some aspects, the UE 120 may be configured to perform one or more operations described herein based at least in part on the configuration information.

As shown by reference number 820, the UE 120 may perform a channel measurement in the first slot 810 using the CSI-RS resource. Moreover, as shown by reference number 825, the UE 120 may perform a first interference measurement in the second slot 815 using the first CSI-IM resource. In aspects in which the configuration information configures the second CSI-IM resource in the first slot 810, the UE 120 may further perform a second interference measurement in the first slot 810 using the second CSI-IM resource. Moreover, in aspects in which the UE 120 performs both the first interference measurement in the second slot 815 (e.g., the SBFD slot) using the first CSI-IM resource and the second interference measurement in the first slot 810 (e.g., the HD slot) using the second CSI-IM resource, the UE 120 may maintain two interference measurement estimates, such as a first average interference measurement associated with IMRs across SBFD slots and a second average interference measurement associated with IMRs across HD slots. Put another way, in some aspects, the UE 120 may be configured to maintain a first average interference measurement associated with the first CSI-IM resource (and thus the second slot 815, e.g., the SBFD slot) and a second average interference measurement associated with the second CSI-IM resource (and thus the first slot 810, e.g., the HD slot).

As shown by reference number 830, in aspects in which the UE 120 is configured with both the first CSI-IM resource (e.g., aspects in which the UE 120 is configured to perform interference measurements in the second slot 815, such as an SBFD slot) and the second CSI-IM resource (e.g., aspects in which the UE 120 is configured to perform interference measurements in the first slot 810, such as an HD slot), the network node 110 may indicate whether the first interference measurement associated with the first CSI-IM resource (e.g., the interference measurement associated with the second slot 815) or the second interference measurement associated with the second CSI-IM resource (e.g., the interference measurement associated with the first slot 810) is to be used for a CSI report to be transmitted by the UE 120 to the network node 110. In some aspects, the indication whether the first interference measurement or the second interference measurement is to be used for the CSI report may be explicit or implicit.

For example, the network node 110 may transmit, and the UE 120 may receive, an explicit indication of whether the first interference measurement or the second interference measurement is to be used for the CSI report. In some aspects, the network node 110 may transmit, and the UE 120 may receive, the indication of whether the first interference measurement or the second interference measurement is to be used for the CSI report via a dynamic message (e.g., a DCI and/or a MAC-CE) triggering one of an aperiodic CSI report or a semi-persistent CSI report.

In some other aspects, the indication of whether the first interference measurement or the second interference measurement is to be used for the CSI report may be based at least in part on whether the UE 120 is configured with an FD restriction for interference measurement parameter (sometimes referred to as FD-RestrictionForInterferenceMeasurment). Put another way, the UE 120 may determine whether the first interference measurement or the second interference measurement is to be used for the CSI report based at least in part on whether the configuration information described above in connection with reference number 805 configures the FD restriction for interference measurement parameter. For example, the UE 120 may be configured to, as a default behavior, maintain one interference measurement (e.g., an interference measurement associated with HD slots, such as the second interference measurement associated with the first slot 810). However, if the FD restriction for interference measurement parameter in a CSI reporting setting (e.g., if the FD restriction for interference measurement parameter is configured via the configuration information described above in connection with reference number 805), the UE 120 may not perform according to the default behavior but instead determine that the CSI report is to be linked with IMRs in FD slots (e.g., the first CSI-IM resource in the second slot 815).

As shown by reference number 835, the UE 120 may transmit, and the network node 110 may receive, the CSI report. In some aspects, the CSI report may be based at least in part on the channel measurement using the CSI-RS resource in the first slot 810 and the first interference measurement using the first CSI-IM resource in the second slot 815. In that way, the CSI report may be based at least in part on a decoupled, in the time domain, CMR and an IMR (e.g., a CMR and an IMR in different slots). In some aspects, such as in aspects in which the UE 120 is configured to provide semi-persistent or periodic CSI reports, the UE 120 may use the first interference measurement (e.g., an interference measurement associated with the second slot 815, which may be an SBFD slot) for some of the semi-persistent/periodic CSI reports, and the UE 120 may use the second interference measurement (e.g., an interference measurement associated with the first slot 810, which may be an HD slot) for others of the semi-persistent/periodic CSI reports. Put another way, the UE 120 may transmit, and the network node 110 may receive, multiple CSI reports, with a first subset of the multiple CSI reports being based at least in part on interference measurements associated with the first CSI-IM resource, and with a second subset of the multiple CSI reports being based at least in part on interference measurements associated with the second CSI-IM resource.

For example, the UE 120 may alternate over two interference measurement estimates for semi-persistent/periodic CSI reporting. More particularly, transmitting the multiple CSI reports may include alternating between transmitting CSI reports associated with the first subset of CSI reports (e.g., CSI reports associated with interference measurements performed in the second slot 815), and transmitting CSI reports associated with the second subset of CSI reports (e.g., CSI reports associated with interference measurements performed in the first slot 810). In some other aspects, transmitting the multiple CSI reports may include transmitting CSI reports associated with the first subset of CSI reports according to a first configured periodicity, and/or transmitting CSI reports associated with the second subset of CSI reports according to a second configured periodicity. More particularly, the configuration information described above in connection with reference number 805 may indicate configured periodicities associated with SBFD CSI reporting and/or HD CSI reporting, and thus the UE 120 may alternate between reports associated with the first CSI-IM resource and the second CSI-IM resource, accordingly. For example, the configuration information may indicate, for semi-persistent/periodic CSI reporting, that the UE 120 is to report HD CSI (e.g., CSI associated with the second CSI-IM resource and/or the second interference measurement) every 2X slots, and that the UE 120 is to report SBFD CSI (e.g., CSI associated with the first CSI-IM resource and/or the first interference measurement) every X slots.

Based at least in part on the network node 110 and/or the UE 120 decoupling an interference measurement slot and a channel measurement slot for CSI reporting, the network node 110 and/or the UE 120 may conserve computing, power, network, and/or communication resources that may have otherwise been consumed configuring multiple coupled CMRs and IMRs across multiple slots. For example, based at least in part on the network node 110 and/or the UE 120 decoupling an interference measurement slot and a channel measurement slot for CSI reporting, overhead may be reduced and/or redundant channel measurements may be eliminated, resulting in reduced power, network, and/or computing resource consumption for CSI reporting.

As indicated above, FIG. 8 is provided as an example. Other examples may differ from what is described with respect to FIG. 8.

Figure 9:
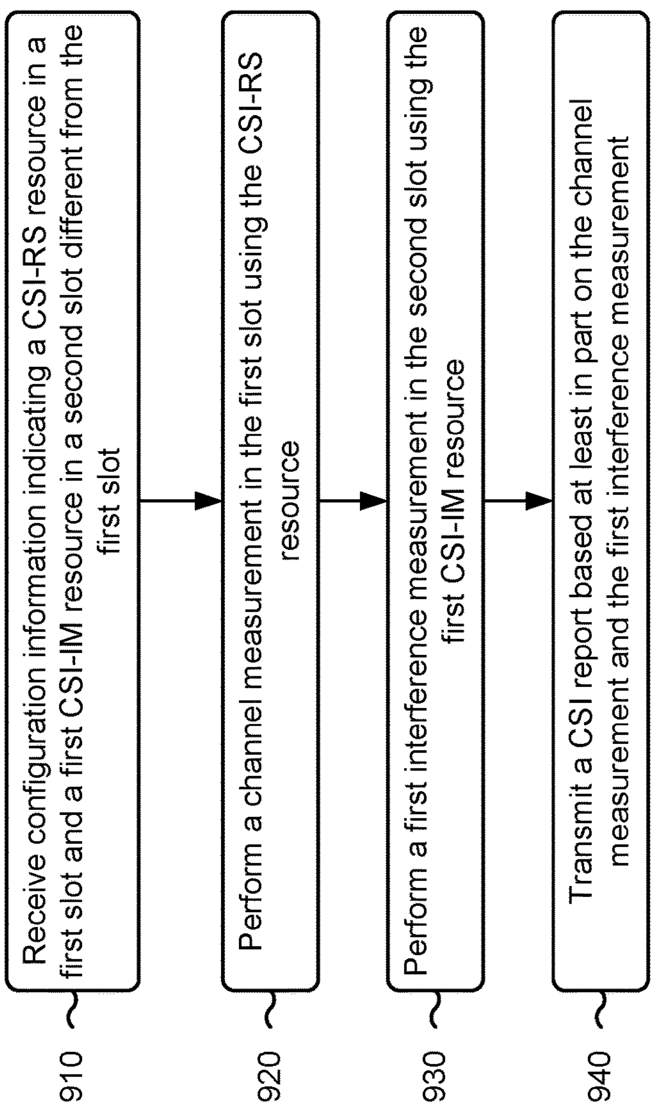
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with decoupling an interference measurement slot and a channel measurement slot for CSI reporting.

As shown in FIG. 9, in some aspects, process 900 may include receiving configuration information indicating a CSI-RS resource in a first slot and a first CSI-IM resource in a second slot different from the first slot (block 910). For example, the UE (e.g., using reception component 1102 and/or communication manager 1106, depicted in FIG. 11) may receive configuration information indicating a CSI-RS resource in a first slot and a first CSI-IM resource in a second slot different from the first slot, as described above.

As further shown in FIG. 9, in some aspects, process 900 may include performing a channel measurement in the first slot using the CSI-RS resource (block 920). For example, the UE (e.g., using communication manager 1106, depicted in FIG. 11) may perform a channel measurement in the first slot using the CSI-RS resource, as described above.

As further shown in FIG. 9, in some aspects, process 900 may include performing a first interference measurement in the second slot using the first CSI-IM resource (block 930). For example, the UE (e.g., using communication manager 1106, depicted in FIG. 11) may perform a first interference measurement in the second slot using the first CSI-IM resource, as described above.

As further shown in FIG. 9, in some aspects, process 900 may include transmitting a CSI report based at least in part on the channel measurement and the first interference measurement (block 940). For example, the UE (e.g., using transmission component 1104 and/or communication manager 1106, depicted in FIG. 11) may transmit a CSI report based at least in part on the channel measurement and the first interference measurement, as described above.

Process 900 may include additional aspects, such as any single aspect or any combination of aspects described below and/or in connection with one or more other processes described elsewhere herein.

In a first aspect, the first slot is associated with a half-duplex slot, and the second slot is associated with a sub-band full duplex slot.

In a second aspect, alone or in combination with the first aspect, the configuration information further indicates a second CSI-IM resource associated with the first slot.

In a third aspect, alone or in combination with one or more of the first and second aspects, process 900 includes receiving an indication of whether the first interference measurement or a second interference measurement associated with the second CSI-IM resource is to be used for the CSI report.

In a fourth aspect, alone or in combination with one or more of the first through third aspects, the indication of whether the first interference measurement or the second interference measurement is to be used for the CSI report is received via a dynamic message triggering one of an aperiodic CSI report or a semi-persistent CSI report.

In a fifth aspect, alone or in combination with one or more of the first through fourth aspects, process 900 includes transmitting multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

In a sixth aspect, alone or in combination with one or more of the first through fifth aspects, transmitting the multiple CSI reports includes alternating between transmitting CSI reports associated with the first subset of CSI reports and transmitting CSI reports associated with the second subset of CSI reports.

In a seventh aspect, alone or in combination with one or more of the first through sixth aspects, transmitting the multiple CSI reports includes at least one of transmitting CSI reports associated with the first subset of CSI reports according to a first configured periodicity, or transmitting CSI reports associated with the second subset of CSI reports according to a second configured periodicity.

In an eighth aspect, alone or in combination with one or more of the first through seventh aspects, process 900 includes determining whether the first interference measurement or a second interference measurement associated with the second CSI-IM resource is to be used for the CSI report based at least in part on whether the configuration information configures a full duplex restriction for interference measurement parameter.

In a ninth aspect, alone or in combination with one or more of the first through eighth aspects, process 900 includes maintaining a first average interference measurement associated with the first CSI-IM resource and a second average interference measurement associated with the second CSI-IM resource.

In a tenth aspect, alone or in combination with one or more of the first through ninth aspects, the configuration information includes a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and the configuration information indicates that the first CSI-IM resource and the second CSI-IM resource are associated with the CSI-RS resource.

In an eleventh aspect, alone or in combination with one or more of the first through tenth aspects, the first CSI-IM resource is associated with at least one of a first period or a first offset, the second CSI-IM resource is associated with at least one of a second period or a second offset, and at least one of the first period differs from the second period, or the first offset differs from the second offset.

In a twelfth aspect, alone or in combination with one or more of the first through eleventh aspects, at least one of the first period or the first offset is associated with a sub-band full duplex slot, and at least one of the second period or the second offset is associated with a half duplex slot.

In a thirteenth aspect, alone or in combination with one or more of the first through twelfth aspects, the configuration information includes a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and the configuration information indicates that the first CSI-IM resource set and the second CSI-IM resource set are associated with the CSI-RS resource set.

In a fourteenth aspect, alone or in combination with one or more of the first through thirteenth aspects, the configuration information includes a CMR configuration associated with a CSI-RS resource set including the CSI-RS resource, a first IMR configuration associated with a first CSI-IM resource set including the first CSI-IM resource, and a second IMR configuration associated with a second CSI-IM resource set including a second CSI-IM resource associated with the first slot, and the configuration information indicates that the first IMR configuration and the second IMR configuration are associated with the CMR configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
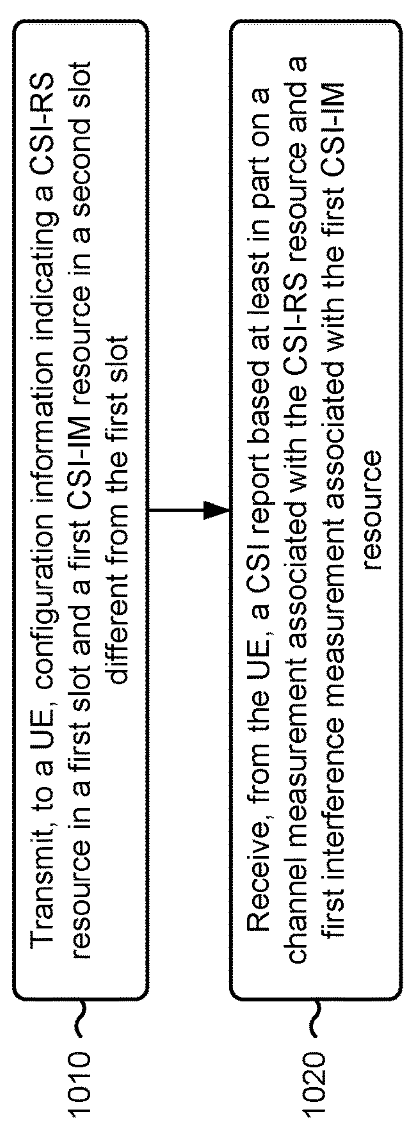
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with decoupling an interference measurement slot and a channel measurement slot for CSI reporting.

As shown in FIG. 10, in some aspects, process 1000 may include transmitting, to a UE, configuration information indicating a CSI-RS resource in a first slot and a first CSI-IM resource in a second slot different from the first slot (block 1010). For example, the network node (e.g., using transmission component 1204 and/or communication manager 1206, depicted in FIG. 12) may transmit, to a UE, configuration information indicating a CSI-RS resource in a first slot and a first CSI-IM resource in a second slot different from the first slot, as described above.

As further shown in FIG. 10, in some aspects, process 1000 may include receiving, from the UE, a CSI report based at least in part on a channel measurement associated with the CSI-RS resource and a first interference measurement associated with the first CSI-IM resource (block 1020). For example, the network node (e.g., using reception component 1202 and/or communication manager 1206, depicted in FIG. 12) may receive, from the UE, a CSI report based at least in part on a channel measurement associated with the CSI-RS resource and a first interference measurement associated with the first CSI-IM resource, as described above.

Process 1000 may include additional aspects, such as any single aspect or any combination of aspects described below and/or in connection with one or more other processes described elsewhere herein.

In a first aspect, the first slot is associated with a half-duplex slot, and the second slot is associated with a sub-band full duplex slot.

In a second aspect, alone or in combination with the first aspect, the configuration information further indicates a second CSI-IM resource associated with the first slot.

In a third aspect, alone or in combination with one or more of the first and second aspects, process 1000 includes transmitting, to the UE, an indication of whether the first interference measurement or a second interference measurement associated with the second CSI-IM resource is to be used for the CSI report.

In a fourth aspect, alone or in combination with one or more of the first through third aspects, the indication of whether the first interference measurement or the second interference measurement is to be used for the CSI report is transmitted via a dynamic message triggering one of an aperiodic CSI report or a semi-persistent CSI report.

In a fifth aspect, alone or in combination with one or more of the first through fourth aspects, process 1000 includes receiving, from the UE, multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

In a sixth aspect, alone or in combination with one or more of the first through fifth aspects, receiving the multiple CSI reports includes alternating between receiving CSI reports associated with the first subset of CSI reports and receiving CSI reports associated with the second subset of CSI reports.

In a seventh aspect, alone or in combination with one or more of the first through sixth aspects, receiving the multiple CSI reports includes at least one of receiving, from the UE, CSI reports associated with the first subset of CSI reports according to a first configured periodicity, or receiving, from the UE, CSI reports associated with the second subset of CSI reports according to a second configured periodicity.

In an eighth aspect, alone or in combination with one or more of the first through seventh aspects, process 1000 includes indicating, to the UE, whether the first interference measurement or a second interference measurement associated with the second CSI-IM resource is to be used for the CSI report based at least in part on whether the configuration information configures a full duplex restriction for interference measurement parameter.

In a ninth aspect, alone or in combination with one or more of the first through eighth aspects, the configuration information includes a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and the configuration information indicates that the first CSI-IM resource and the second CSI-IM resource are associated with the CSI-RS resource.

In a tenth aspect, alone or in combination with one or more of the first through ninth aspects, the first CSI-IM resource is associated with at least one of a first period or a first offset, the second CSI-IM resource is associated with at least one of a second period or a second offset, and at least one of the first period differs from the second period, or the first offset differs from the second offset.

In an eleventh aspect, alone or in combination with one or more of the first through tenth aspects, at least one of the first period or the first offset is associated with a sub-band full duplex slot, and at least one of the second period or the second offset is associated with a half duplex slot.

In a twelfth aspect, alone or in combination with one or more of the first through eleventh aspects, the configuration information includes a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and the configuration information indicates that the first CSI-IM resource set and the second CSI-IM resource set are associated with the CSI-RS resource set.

In a thirteenth aspect, alone or in combination with one or more of the first through twelfth aspects, the configuration information includes a CMR configuration associated with a CSI-RS resource set including the CSI-RS resource, a first IMR configuration associated with a first CSI-IM resource set including the first CSI-IM resource, and a second IMR configuration associated with a second CSI-IM resource set including a second CSI-IM resource associated with the first slot, and the configuration information indicates that the first IMR configuration and the second IMR configuration are associated with the CMR configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
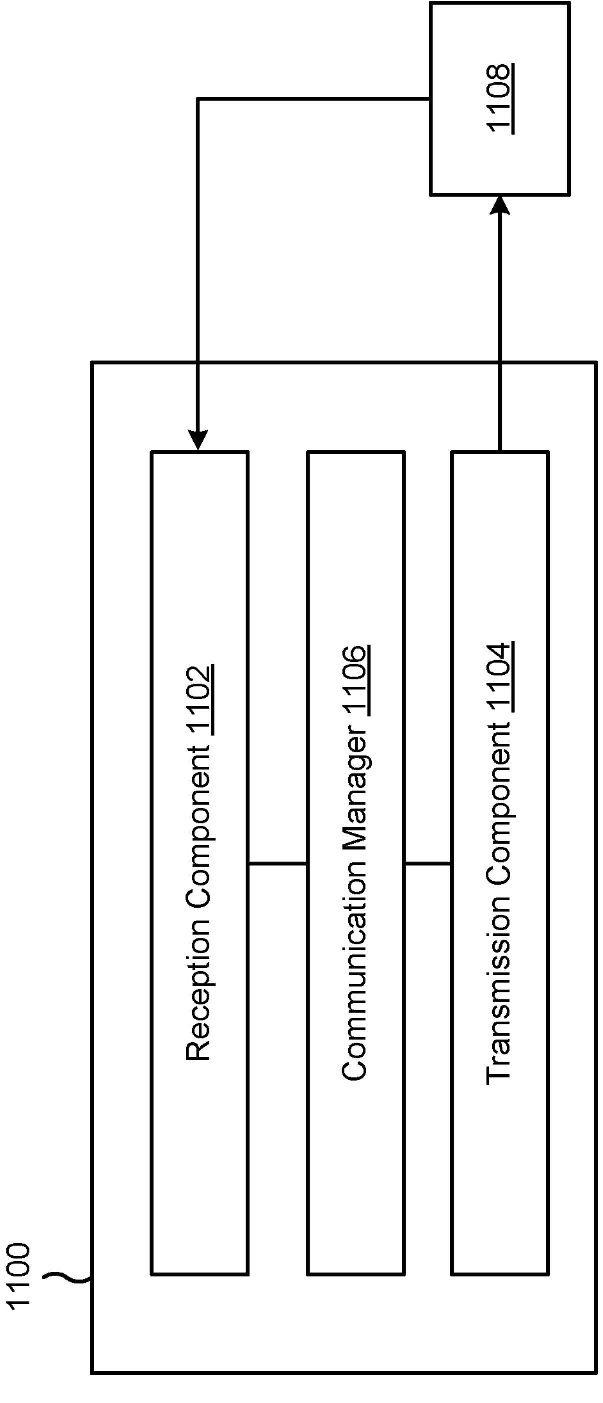
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7A-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive configuration information indicating a CSI-RS resource in a first slot and a first CSI-IM resource in a second slot different from the first slot. The communication manager 1106 may perform a channel measurement in the first slot using the CSI-RS resource. The communication manager 1106 may perform a first interference measurement in the second slot using the first CSI-IM resource. The transmission component 1104 may transmit a CSI report based at least in part on the channel measurement and the first interference measurement.

The reception component 1102 may receive an indication of whether the first interference measurement or a second interference measurement associated with the second CSI-IM resource is to be used for the CSI report.

The transmission component 1104 may transmit multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

The communication manager 1106 may determine whether the first interference measurement or a second interference measurement associated with the second CSI- IM resource is to be used for the CSI report based at least in part on whether the configuration information configures a full duplex restriction for interference measurement parameter.

The communication manager 1106 may maintain a first average interference measurement associated with the first CSI-IM resource and a second average interference measurement associated with the second CSI-IM resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
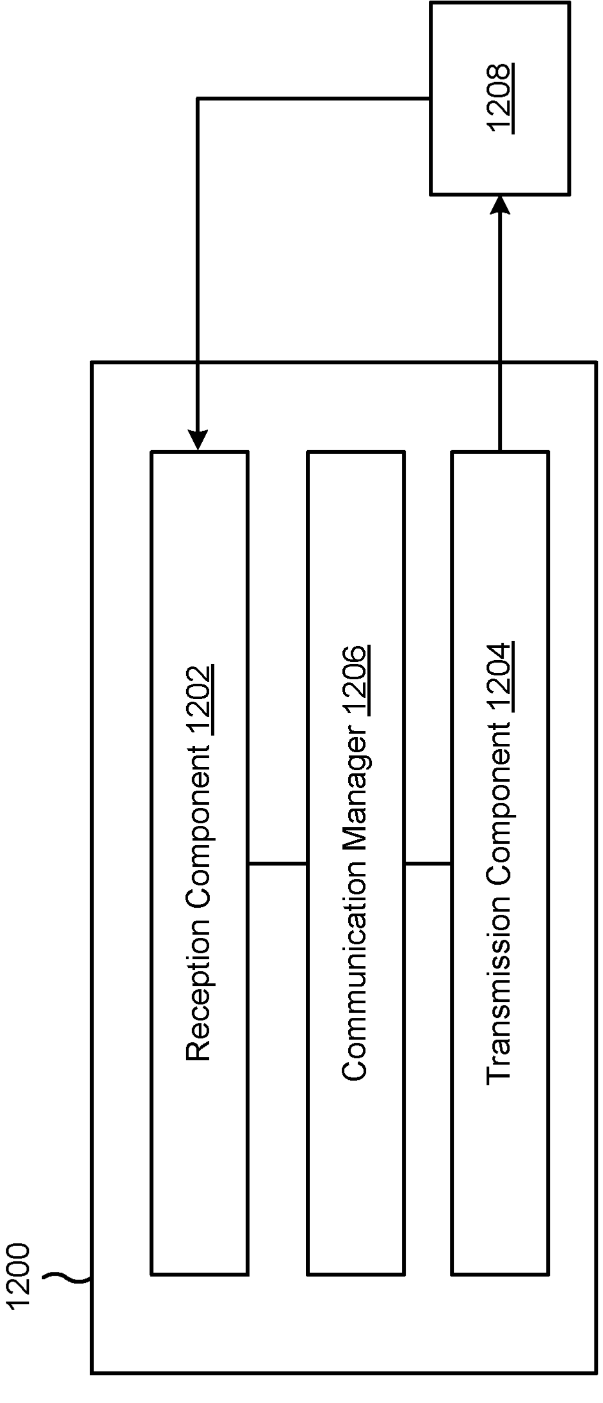
FIG. 12 is a diagram of another example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 7A-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE, configuration information indicating a CSI-RS resource in a first slot and a first CSI-IM resource in a second slot different from the first slot. The reception component 1202 may receive, from the UE, a CSI report based at least in part on a channel measurement associated with the CSI-RS resource and a first interference measurement associated with the first CSI-IM resource.

The transmission component 1204 may transmit, to the UE, an indication of whether the first interference measurement or a second interference measurement associated with the second CSI-IM resource is to be used for the CSI report.

The reception component 1202 may receive, from the UE, multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

The communication manager 1206 may indicate, to the UE, whether the first interference measurement or a second interference measurement associated with the second CSI-IM resource is to be used for the CSI report based at least in part on whether the configuration information configures a full duplex restriction for interference measurement parameter.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving configuration information indicating a CSI-RS resource in a first slot and a first CSI-IM resource in a second slot different from the first slot; performing a channel measurement in the first slot using the CSI-RS resource; performing a first interference measurement in the second slot using the first CSI-IM resource; and transmitting a CSI report based at least in part on the channel measurement and the first interference measurement.

Aspect 2: The method of Aspect 1, wherein the first slot is associated with a half-duplex slot, and wherein the second slot is associated with a sub-band full duplex slot.

Aspect 3: The method of any of Aspects 1-2, wherein the configuration information further indicates a second CSI-IM resource associated with the first slot.

Aspect 4: The method of Aspect 3, further comprising receiving an indication of whether the first interference measurement or a second interference measurement associated with the second CSI-IM resource is to be used for the CSI report.

Aspect 5: The method of Aspect 4, wherein the indication of whether the first interference measurement or the second interference measurement is to be used for the CSI report is received via a dynamic message triggering one of an aperiodic CSI report or a semi-persistent CSI report.

Aspect 6: The method of Aspect 3, further comprising transmitting multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

Aspect 7: The method of Aspect 6, wherein transmitting the multiple CSI reports includes alternating between transmitting CSI reports associated with the first subset of CSI reports and transmitting CSI reports associated with the second subset of CSI reports.

Aspect 8: The method of Aspect 6, wherein transmitting the multiple CSI reports includes at least one of: transmitting CSI reports associated with the first subset of CSI reports according to a first configured periodicity, or transmitting CSI reports associated with the second subset of CSI reports according to a second configured periodicity.

Aspect 9: The method of Aspect 3, further comprising determining whether the first interference measurement or a second interference measurement associated with the second CSI-IM resource is to be used for the CSI report based at least in part on whether the configuration information configures a full duplex restriction for interference measurement parameter.

Aspect 10: The method of Aspect 3, further comprising maintaining a first average interference measurement associated with the first CSI-IM resource and a second average interference measurement associated with the second CSI-IM resource.

Aspect 11: The method of any of Aspects 1-10, wherein the configuration information includes: a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and wherein the configuration information indicates that the first CSI-IM resource and the second CSI-IM resource are associated with the CSI-RS resource.

Aspect 12: The method of Aspect 11, wherein the first CSI-IM resource is associated with at least one of a first period or a first offset, wherein the second CSI-IM resource is associated with at least one of a second period or a second offset, and wherein at least one of: the first period differs from the second period, or the first offset differs from the second offset.

Aspect 13: The method of Aspect 12, wherein at least one of the first period or the first offset is associated with a sub-band full duplex slot, and wherein at least one of the second period or the second offset is associated with a half duplex slot.

Aspect 14: The method of any of Aspects 1-13, wherein the configuration information includes: a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and wherein the configuration information indicates that the first CSI-IM resource set and the second CSI-IM resource set are associated with the CSI-RS resource set.

Aspect 15: The method of any of Aspects 1-14, wherein the configuration information includes: a CMR configuration associated with a CSI-RS resource set including the CSI-RS resource, a first IMR configuration associated with a first CSI-IM resource set including the first CSI-IM resource, and a second IMR configuration associated with a second CSI-IM resource set including a second CSI-IM resource associated with the first slot, and wherein the configuration information indicates that the first IMR configuration and the second IMR configuration are associated with the CMR configuration.

Aspect 16: A method of wireless communication performed by a network node, comprising: transmitting, to a UE, configuration information indicating a CSI-RS resource in a first slot and a first CSI-IM resource in a second slot different from the first slot; and receiving, from the UE, a CSI report based at least in part on a channel measurement associated with the CSI-RS resource and a first interference measurement associated with the first CSI-IM resource.

Aspect 17: The method of Aspect 16, wherein the first slot is associated with a half-duplex slot, and wherein the second slot is associated with a sub-band full duplex slot.

Aspect 18: The method of any of Aspects 16-17, wherein the configuration information further indicates a second CSI-IM resource associated with the first slot.

Aspect 19: The method of Aspect 18, further comprising transmitting, to the UE, an indication of whether the first interference measurement or a second interference measurement associated with the second CSI-IM resource is to be used for the CSI report.

Aspect 20: The method of Aspect 19, wherein the indication of whether the first interference measurement or the second interference measurement is to be used for the CSI report is transmitted via a dynamic message triggering one of an aperiodic CSI report or a semi-persistent CSI report.

Aspect 21: The method of Aspect 18, further comprising receiving, from the UE, multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

Aspect 22: The method of Aspect 21, wherein receiving the multiple CSI reports includes alternating between receiving CSI reports associated with the first subset of CSI reports and receiving CSI reports associated with the second subset of CSI reports.

Aspect 23: The method of Aspect 21, wherein receiving the multiple CSI reports includes at least one of: receiving, from the UE, CSI reports associated with the first subset of CSI reports according to a first configured periodicity, or receiving, from the UE, CSI reports associated with the second subset of CSI reports according to a second configured periodicity.

Aspect 24: The method of Aspect 18, further comprising indicating, to the UE, whether the first interference measurement or a second interference measurement associated with the second CSI-IM resource is to be used for the CSI report based at least in part on whether the configuration information configures a full duplex restriction for interference measurement parameter.

Aspect 25: The method of any of Aspects 16-24, wherein the configuration information includes: a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and wherein the configuration information indicates that the first CSI-IM resource and the second CSI-IM resource are associated with the CSI-RS resource.

Aspect 26: The method of Aspect 25, wherein the first CSI-IM resource is associated with at least one of a first period or a first offset, wherein the second CSI-IM resource is associated with at least one of a second period or a second offset, and wherein at least one of: the first period differs from the second period, or the first offset differs from the second offset.

Aspect 27: The method of Aspect 26, wherein at least one of the first period or the first offset is associated with a sub-band full duplex slot, and wherein at least one of the second period or the second offset is associated with a half duplex slot.

Aspect 28: The method of any of Aspects 16-27, wherein the configuration information includes: a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and wherein the configuration information indicates that the first CSI-IM resource set and the second CSI-IM resource set are associated with the CSI-RS resource set.

Aspect 29: The method of any of Aspects 16-28, wherein the configuration information includes: a CMR configuration associated with a CSI-RS resource set including the CSI-RS resource, a first IMR configuration associated with a first CSI-IM resource set including the first CSI-IM resource, and a second IMR configuration associated with a second CSI-IM resource set including a second CSI-IM resource associated with the first slot, and wherein the configuration information indicates that the first IMR configuration and the second IMR configuration are associated with the CMR configuration.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive configuration information indicating a channel state information (CSI) reference signal (CSI-RS) resource in a first slot and a first CSI interference measurement (CSI-IM) resource in a second slot different from the first slot, the first slot being a half-duplex slot and the second slot being a sub-band full duplex slot;

perform a channel measurement in the first slot using the CSI-RS resource;

perform a first interference measurement in the second slot using the first CSI-IM resource; and transmit a CSI report based at least in part on the channel measurement in the half-duplex slot and the first interference measurement in the sub-band full duplex slot.

2. The UE of claim 1, wherein the configuration information further indicates a second CSI-IM resource associated with the first slot.

3. The UE of claim 2, wherein the one or more processors are further configured to receive an indication of whether the first interference measurement or a second interference measurement associated with the second CSI-IM resource is to be used for the CSI report.

4. The UE of claim 3, wherein the one or more processors are further configured to receive the indication of whether the first interference measurement or the second interference measurement is to be used for the CSI report via a dynamic message triggering one of an aperiodic CSI report or a semi-persistent CSI report.

5. The UE of claim 2, wherein the one or more processors are further configured to transmit multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

6. The UE of claim 5, wherein the one or more processors, to transmit the multiple CSI reports, are configured to alternate between transmitting CSI reports associated with the first subset of CSI reports and transmitting CSI reports associated with the second subset of CSI reports.

7. The UE of claim 5, wherein the one or more processors, to transmit the multiple CSI reports, are configured to:

transmit CSI reports associated with the first subset of CSI reports according to a first configured periodicity, or transmit CSI reports associated with the second subset of CSI reports according to a second configured periodicity.

8. The UE of claim 2, wherein the one or more processors are further configured to determine whether the first interference measurement or a second interference measurement associated with the second CSI-IM resource is to be used for the CSI report based at least in part on whether the configuration information configures a full duplex restriction for interference measurement parameter.

9. The UE of claim 2, wherein the one or more processors are further configured to maintain a first average interference measurement associated with the first CSI-IM resource and a second average interference measurement associated with the second CSI-IM resource.

10. The UE of claim 1, wherein the configuration information includes:

a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and wherein the configuration information indicates that the first CSI-IM resource and the second CSI-IM resource are associated with the CSI-RS resource.

11. The UE of claim 10, wherein the first CSI-IM resource is associated with at least one of a first period or a first offset, wherein the second CSI-IM resource is associated with at least one of a second period or a second offset, and wherein at least one of:

the first period differs from the second period, or the first offset differs from the second offset.

12. The UE of claim 11, wherein at least one of the first period or the first offset is associated with a sub-band full duplex slot, and wherein at least one of the second period or the second offset is associated with a half duplex slot.

13. The UE of claim 1, wherein the configuration information includes:

a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and wherein the configuration information indicates that the first CSI-IM resource set and the second CSI-IM resource set are associated with the CSI-RS resource set.

14. The UE of claim 1, wherein the configuration information includes:

a channel measurement resource (CMR) configuration associated with a CSI-RS resource set including the CSI-RS resource, a first interference measurement resource (IMR) configuration associated with a first CSI-IM resource set including the first CSI-IM resource, and a second IMR configuration associated with a second CSI-IM resource set including a second CSI-IM resource associated with the first slot, and wherein the configuration information indicates that the first IMR configuration and the second IMR configuration are associated with the CMR configuration.

15. A network node for wireless communication, comprising:

a memory; and one or more processors, coupled to the memory, configured to:

transmit, to a user equipment (UE), configuration information indicating a channel state information (CSI) reference signal (CSI-RS) resource in a first slot and a first CSI interference measurement (CSI-IM) resource in a second slot different from the first slot, the first slot being a half-duplex slot and the second slot being a sub-band full duplex slot; and receive, from the UE, a CSI report based at least in part on a channel measurement in the half-duplex slot associated with the CSI-RS resource and a first interference measurement in the sub-band full duplex slot associated with the first CSI-IM resource, wherein the second slot is different from the first slot.

16. The network node of claim 15, wherein the configuration information further indicates a second CSI-IM resource associated with the first slot.

17. The network node of claim 16, wherein the one or more processors are further configured to transmit, to the UE, an indication of whether the first interference measurement or a second interference measurement associated with the second CSI-IM resource is to be used for the CSI report.

18. The network node of claim 17, wherein the one or more processors are further configured to transmit the indication of whether the first interference measurement or the second interference measurement is to be used for the CSI report via a dynamic message triggering one of an aperiodic CSI report or a semi-persistent CSI report.

19. The network node of claim 16, wherein the one or more processors are further configured to receive, from the UE, multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

20. The network node of claim 16, wherein the one or more processors are further configured to indicate, to the UE, whether the first interference measurement or a second interference measurement associated with the second CSI-IM resource is to be used for the CSI report based at least in part on whether the configuration information configures a full duplex restriction for interference measurement parameter.

21. The network node of claim 15, wherein the configuration information includes:

a channel measurement resource configuration associated with a CSI-RS resource set including the CSI-RS resource, and an interference measurement resource configuration associated with a CSI-IM resource set including the first CSI-IM resource and a second CSI-IM resource associated with the first slot, and wherein the configuration information indicates that the first CSI-IM resource and the second CSI-IM resource are associated with the CSI-RS resource.

22. The network node of claim 15, wherein the configuration information includes:

a channel measurement resource configuration associated with a CSI-RS resource set including the CSI-RS resource, and an interference measurement resource configuration associated with a first CSI-IM resource set including the first CSI-IM resource and a second CSI-IM resource set including a second CSI-IM resource associated with the first slot, and wherein the configuration information indicates that the first CSI-IM resource set and the second CSI-IM resource set are associated with the CSI-RS resource set.

23. The network node of claim 15, wherein the configuration information includes:

a channel measurement resource (CMR) configuration associated with a CSI-RS resource set including the CSI-RS resource, a first interference measurement resource (IMR) configuration associated with a first CSI-IM resource set including the first CSI-IM resource, and a second IMR configuration associated with a second CSI-IM resource set including a second CSI-IM resource associated with the first slot, and wherein the configuration information indicates that the first IMR configuration and the second IMR configuration are associated with the CMR configuration.

24. A method of wireless communication performed by a user equipment (UE), comprising:

receiving configuration information indicating a channel state information (CSI) reference signal (CSI-RS) resource in a first slot and a first CSI interference measurement (CSI-IM) resource in a second slot different from the first slot, the first slot being a half-duplex slot and the second slot being a sub-band full duplex slot;

performing a channel measurement in the first slot using the CSI-RS resource;

performing a first interference measurement in the second slot using the first CSI-IM resource; and transmitting a CSI report based at least in part on the channel measurement in the half-duplex slot and the first interference measurement in the sub-band full duplex slot.

25. The method of claim 24, wherein the configuration information further indicates a second CSI-IM resource associated with the first slot.

26. The method of claim 25, further comprising: receiving an indication of whether the first interference measurement or a second interference measurement associated with the second CSI-IM resource is to be used for the CSI report.

27. The method of claim 25, further comprising: transmitting multiple CSI reports, wherein a first subset of the multiple CSI reports are based at least in part on interference measurements associated with the first CSI-IM resource, and wherein a second subset of the multiple CSI reports are based at least in part on interference measurements associated with the second CSI-IM resource.

28. The method of claim 25, further comprising: determining whether the first interference measurement or a second interference measurement associated with the second CSI-IM resource is to be used for the CSI report based at least in part on whether the configuration information configures a full duplex restriction for interference measurement parameter.

29. The method of claim 25, further comprising: maintaining a first average interference measurement associated with the first CSI-IM resource and a second average interference measurement associated with the second CSI-IM resource.

30. A method of wireless communication performed by a network node, comprising:

transmitting, to a user equipment (UE), configuration information indicating a channel state information (CSI) reference signal (CSI-RS) resource in a first slot and a first CSI interference measurement (CSI-IM) resource in a second slot different from the first slot, the first slot being a half-duplex slot and the second slot being a sub-band full duplex slot; and receiving, from the UE, a CSI report based at least in part on a channel measurement in the half-duplex slot associated with the CSI-RS resource and a first interference measurement in the sub-band full duplex slot associated with the first CSI-IM resource.

* * * * *